United States Patent
Aggarwal

(10) Patent No.: US 9,634,455 B1
(45) Date of Patent: Apr. 25, 2017

(54) GAS OPTIMIZATION IN A GAS DISCHARGE LIGHT SOURCE

(71) Applicant: Cymer, LLC, San Diego, CA (US)

(72) Inventor: Tanuj Aggarwal, San Diego, CA (US)

(73) Assignee: Cymer, LLC, San Diego, CA (US)

( * ) Notice: Subject to any disclaimer, the term of this patent is extended or adjusted under 35 U.S.C. 154(b) by 0 days.

(21) Appl. No.: 15/044,677

(22) Filed: Feb. 16, 2016

(51) Int. Cl.
*H01S 3/036* (2006.01)
*H01S 3/225* (2006.01)
*H01S 3/23* (2006.01)
*H01S 3/11* (2006.01)

(52) U.S. Cl.
CPC ............... *H01S 3/036* (2013.01); *H01S 3/11* (2013.01); *H01S 3/225* (2013.01); *H01S 3/2366* (2013.01)

(58) Field of Classification Search
CPC ........ H01S 3/036; H01S 3/225–3/2258; H01S 3/2366
See application file for complete search history.

(56) References Cited

U.S. PATENT DOCUMENTS

| | | | | |
|---|---|---|---|---|
| 4,316,157 A | * | 2/1982 | Dosi | H01S 3/036 372/59 |
| 4,794,613 A | * | 12/1988 | Nilsen | H01S 3/036 372/33 |
| 5,440,578 A | | 8/1995 | Sandstrom | |
| 5,450,436 A | * | 9/1995 | Mizoguchi | H01S 3/036 372/57 |
| 5,533,040 A | * | 7/1996 | Zhang | B23K 26/06 257/E21.133 |
| 5,978,406 A | | 11/1999 | Rokni et al. | |
| 6,028,880 A | * | 2/2000 | Carlesi | G03F 7/70558 372/57 |
| 6,151,349 A | | 11/2000 | Gong et al. | |
| 6,212,214 B1 | * | 4/2001 | Vogler | G03F 7/70025 372/55 |
| 6,219,367 B1 | * | 4/2001 | Atsumi | H01S 3/225 372/58 |
| 6,240,117 B1 | | 5/2001 | Gong et al. | |
| 6,563,853 B2 | | 5/2003 | Heist et al. | |
| 8,295,316 B2 | * | 10/2012 | Akins | G03F 7/70025 372/29.014 |
| 8,411,720 B2 | | 4/2013 | O'Brien et al. | |
| 9,130,337 B1 | | 9/2015 | O'Brien et al. | |
| 2002/0057724 A1 | * | 5/2002 | Vogler | G03F 7/70025 372/58 |

(Continued)

*Primary Examiner* — Joshua King
(74) *Attorney, Agent, or Firm* — DiBerardino McGovern IP Group LLC

(57) ABSTRACT

One or more operating characteristics of a light source are adjusted by estimating a plurality of extreme values of operating parameters of the light source while operating the light source under a set of extreme test conditions. For each extreme test condition, a group of pulses of energy is supplied to a first gas discharge chamber of the light source while operating the first gas discharge chamber under the extreme test condition to produce a first pulsed amplified light beam; a group of pulses of energy is supplied to a second gas discharge chamber of the light source while operating the second gas discharge chamber under the extreme test condition to produce a second pulsed amplified light beam. An extreme value of an operating parameter for the extreme test condition is measured to thereby estimate the extreme value of the operating parameter.

24 Claims, 11 Drawing Sheets

(56) References Cited

U.S. PATENT DOCUMENTS

| | | | |
|---|---|---|---|
| 2006/0056478 A1 | 3/2006 | Albrecht et al. | |
| 2007/0213697 A1* | 9/2007 | Holliday | A61F 9/008 606/10 |
| 2008/0205472 A1 | 8/2008 | Dunstan et al. | |
| 2012/0236885 A1* | 9/2012 | Watanabe | H01S 3/03 372/31 |
| 2013/0000773 A1* | 1/2013 | Jiang | H01S 3/036 141/8 |
| 2014/0063488 A1* | 3/2014 | Adler | G01B 9/02067 356/51 |
| 2016/0141823 A1* | 5/2016 | Nishio | H01S 3/036 372/38.02 |

* cited by examiner

GAS OPTIMIZATION IN A GAS DISCHARGE LIGHT SOURCE

TECHNICAL FIELD

The disclosed subject matter relates to adjusting conditions associated with a gas in a light source after the gas discharge chambers of the light source have been refilled with gas.

BACKGROUND

One type of gas discharge light source used in photolithography is known as an excimer light source or laser. An excimer laser typically uses a combination of one or more noble gases, such as argon, krypton, or xenon, and a reactive such as fluorine or chlorine. The excimer laser derives its name from the fact that under the appropriate condition of electrical stimulation (energy supplied) and high pressure (of the gas mixture), a pseudo-molecule called an excimer is created, which only exists in an energized state and gives rise to amplified light in the ultraviolet range.

Excimer light sources are used in photolithography machines. The excimer light source produces deep ultraviolet (DUV) light. An excimer light source can be built using a single gas discharge chamber or using a plurality of gas discharge chambers.

SUMMARY

In some general aspects, a method is described for adjusting one or more operating characteristics of a light source. The light source includes a first stage with a first gas discharge chamber filled with a first gas mixture and including a first pulsed energy source, and a second stage with a second gas discharge chamber filled with a second gas mixture and including a second pulsed energy source. The method includes estimating a plurality of extreme values of operating parameters of the light source while operating the light source under a set of extreme test conditions. For each extreme test condition, a group of pulses of energy is supplied to the first gas discharge chamber while operating the first gas discharge chamber under the extreme test condition to produce a first pulsed amplified light beam from the first stage that is directed to the second stage; a group of pulses of energy is supplied to the second gas discharge chamber while operating the second gas discharge chamber under the extreme test condition and while the first pulsed amplified light beam is input to the second gas discharge chamber to produce a second pulsed amplified light beam; and an extreme value of an operating parameter for the extreme test condition is measured to thereby estimate the extreme value of the operating parameter. The method also includes determining whether to adjust at least one operating characteristic of the light source out of a plurality of operating characteristics based on the estimated plurality of extreme values of operating parameters; and, if it is determined that an operating characteristic should be adjusted, then adjusting that operating characteristic.

Implementations can include one or more of the following features. For example, the method can also include determining a plurality of error values, each error value being determined from one or more measured extreme values of the operating parameters.

The group of pulses of energy can be supplied to the first gas discharge chamber by supplying a burst of pulses of energy to the first gas discharge chamber. The group of pulses of energy can be supplied to the second gas discharge chamber by supplying a burst of pulses of energy to the second gas discharge chamber.

The light source can be operated under the set of extreme test conditions by operating the light source under an extreme test condition in which energy supplied to the first gas discharge chamber is increased while operating at a non-optimum relative timing between pulses of the first amplified light beam and the second amplified light beam. The extreme value of the operating parameter for the extreme test condition can be measured by measuring a maximum energy of the second pulsed amplified light beam.

The light source can be operated under the set of extreme test conditions by operating the light source under an extreme test condition in which energy supplied to the first gas discharge chamber is decreased while operating at an optimum relative timing between pulses of the first amplified light beam and the second amplified light beam. The extreme value of the operating parameter for the extreme test condition can be measured by measuring a minimum energy of the second pulsed amplified light beam.

The light source can be operated under the set of extreme test conditions by operating the light source under an extreme test condition in which a relative timing between pulses of the first amplified light beam and the second amplified light beam is decreased while supplying a minimum energy to the first gas discharge chamber. The extreme value of the operating parameter for the extreme test condition can be measured by measuring a maximum spectral property of the second pulsed amplified light beam.

The light source can be operated under the set of extreme test conditions by operating the light source under an extreme test condition in which a relative timing between pulses of the first amplified light beam and the second amplified light beam is increased while supplying a maximum energy to the first gas discharge chamber. The extreme value of the operating parameter for the extreme test condition can be measured by measuring a minimum spectral property of the second pulsed amplified light beam.

The extreme value of an operating parameter for the extreme test condition can be measured by: measuring a maximum energy of the second pulsed amplified light beam while operating the light source under a first extreme test condition; and measuring a minimum energy of the second pulsed amplified light beam while operating the light source under a second extreme test condition. The extreme value of an operating parameter for the extreme test condition can be measured by: measuring a maximum spectral property of the second pulsed amplified light beam while operating the light source under a third extreme test condition; and measuring a minimum spectral property of the second pulsed amplified light beam while operating the light source under a fourth extreme test condition.

The extreme value of the operating parameter can be measured by measuring one or more of: an extreme value of an energy of the second pulsed amplified light beam, and an extreme value of a spectral property of the second pulsed amplified light beam.

Determining whether to adjust an operating characteristic of the light source can be additionally based on one or more of a plurality of calibrated constants and a plurality of nonlinear functions.

Determining whether to adjust at least one operating characteristic of the light source can include: determining whether to adjust a pressure of a gas mixture of at least one of the gas discharge chambers and determining whether to adjust an optical feature of a pulsed amplified light beam.

Determining whether to adjust the optical feature of the pulsed amplified light beam can include determining whether to adjust an optical magnification of the first pulsed amplified light beam. The pressure of the gas mixture of the at least one gas discharge chamber can be adjusted by permitting at least some of the gas mixture to escape from the gas discharge chamber. The optical feature of the pulsed amplified light beam can be adjusted by adjusting an optical magnification of the first pulsed amplified light beam to thereby adjust a bandwidth of the second pulsed amplified light beam.

Determining whether to adjust the pressure of the gas mixture of the at least one gas discharge chamber can include determining whether a measured pressure of the gas mixture is greater than a lower acceptable value and an energy of the second pulsed amplified light beam is in an acceptable range. The method can also include determining that the pressure of the gas mixture of the at least one gas discharge chamber should be adjusted only if the measured pressure of the gas mixture is greater than the lower acceptable value and the energy of the second pulsed amplified light beam is in the acceptable range.

Determining whether to adjust the optical feature of the pulsed amplified light beam can include determining whether a condition of a spectral property actuation is met. The method can include determining that the optical feature of the pulsed amplified light beam should be adjusted only if the condition of the spectral property actuator is met.

Determining whether to adjust the pressure of the gas mixture of the at least one gas discharge chamber can include determining whether to adjust the pressure of the gas mixture of the second gas discharge chamber.

Determining whether to adjust at least one operating characteristic of the light source based on the estimated plurality of extreme values of operating parameters can include: determining whether to adjust a first operating characteristic based on at least two estimated extreme values of distinct operating parameters; and determining whether to adjust a second operating characteristic based on at least two estimated extreme values of distinct operating parameters.

The plurality of extreme values of operating parameters can be estimated by at least: averaging a first measured extreme value and a second measured extreme value of a first operating parameter to obtain an averaged value of the first operating parameter and adjusting the averaged value of the first operating parameter by a first predetermined range to obtain a first error value; averaging a first measured extreme value and a second measured extreme value of a second operating parameter to obtain an averaged value of the second operating parameter and adjusting the averaged value of the second operating parameter by a second predetermined range to obtain a second error value.

Determining whether to adjust at least one operating characteristic of the light source can include: determining whether to adjust a first operating characteristic based on at least the first and second error values; and determining whether to adjust a second operating characteristic based on at least the first and second error values.

Determining whether to adjust at least one operating characteristic of the light source can include determining whether to adjust at least one operating characteristic associated with the second stage; and adjusting the operating characteristic if is determined that the operating characteristic should be adjusted can include adjusting the operating characteristic associated with the second stage. The method can also include, prior to determining whether to adjust the at least one operating characteristic associated with the second stage and adjusting the operating characteristic of the second stage if it is determined that it should be adjusted: determining whether to adjust one or more operating characteristics associated the first stage; and, if it is determined that an operating characteristic associated with the first stage should be adjusted, then adjusting the operating characteristic associated with the first stage.

Determining whether to adjust at least one operating characteristic of the light source can include simultaneously determining whether to adjust a plurality of operating characteristics of the light source.

In other general aspects, a method is described for adjusting one or more operating characteristics of a light source. The light source includes a first stage with a first gas discharge chamber filled with a first gas mixture and including a first pulsed energy source. The light source includes a second stage with a second gas discharge chamber filled with a second gas mixture and including a second pulsed energy source. The method includes supplying energy to the first gas discharge chamber using the first pulsed energy source until a pulsed amplified light beam is output from the first stage and directed toward the second stage. The method includes, while the energy is supplied to the first gas discharge chamber: measuring a value of an operating parameter of the first gas discharge chamber; determining whether to adjust an operating characteristic of the first gas discharge chamber based on the measured value; and, if it is determined that the operating characteristic of the first gas discharge chamber should be adjusted, then adjusting the operating characteristic of the first gas discharge chamber. The method also includes, after it is determined that the operating characteristic of the first gas discharge chamber no longer should be adjusted, then applying an adjustment procedure to an operating characteristic of the second gas discharge chamber.

Implementations can include one or more of the following features. For example, determining whether to adjust an operating characteristic of the first gas discharge chamber can include determining whether to adjust a condition of the first gas mixture in the first gas discharge chamber.

The value of the operating parameter of the first gas discharge chamber can be measured by measuring an energy of the pulsed amplified light beam output from the first gas discharge chamber; and determining whether to adjust the operating characteristic of the first gas discharge chamber can include determining whether the measured energy is outside a target range.

The energy can be supplied to the first gas chamber by supplying a pulsed electrical discharge that provides energy to the first gas mixture.

The operating characteristic of the first gas discharge chamber can be adjusted by adjusting a pressure of the first gas mixture in the first gas discharge chamber. The pressure of the first gas mixture in the first gas discharge chamber can be adjusted by permitting at least some of the first gas mixture to escape from the first gas discharge chamber.

The operating characteristic of the first gas discharge chamber can be adjusted while a timing between the pulses of the amplified light beam output from the first energy source and pulses of an amplified light beam output from the second energy source is detuned. The operating characteristic of the first gas discharge chamber can be adjusted while a timing between the pulses of the amplified light beam output from the first energy source and pulses of an amplified light beam output from the second energy source is held constant.

The operating characteristic of the first gas discharge chamber can be adjusted by adjusting the operating characteristic of the first gas discharge chamber while the energy that is supplied to the first gas discharge chamber is held constant. The operating characteristic of the first gas discharge chamber can be adjusted by adjusting the operating characteristic of the first gas discharge chamber while the energy that is supplied to the first gas discharge chamber is held at a maximum acceptable voltage.

Determining whether to adjust the operating characteristic of the first gas discharge chamber can include determining whether the measured value of the operating parameter is above a predetermined value. If it is determined that the measured value of the operating parameter is above the predetermined value, then it can be determined that the operating characteristic of the first gas discharge chamber should be adjusted.

The method can also include filling the first gas discharge chamber with the first gas mixture and filling the second gas discharge chamber with the second gas mixture.

The adjustment procedure can be applied to the operating characteristic of the second gas discharge chamber by: estimating one or more extreme values of operating parameters associated with the second gas discharge chamber while operating the light source under a set of extreme test conditions. The estimating can include, for each extreme test condition: operating the light source under the extreme test condition; and measuring an extreme value of an operating parameter for the extreme test condition. The method can also include determining whether to adjust at least one operating characteristic of the second gas discharge chamber based on the estimated one or more extreme values of the operating parameters, and, if it is determined that an operating characteristic of the second gas discharge chamber should be adjusted, then adjusting that operating characteristic of the second gas discharge chamber.

Determining whether to adjust at least one operating characteristic of the second gas discharge chamber can include determining whether to adjust one or more of: a condition of the second gas mixture and an optical feature of a pulsed amplified light beam output from the second stage. Determining whether to adjust the condition of the second gas mixture can include determining whether to adjust a pressure of the second gas mixture, and determining whether to adjust an optical feature of the pulsed amplified light beam output from the second stage can include determining whether to adjust a bandwidth of the pulsed amplified light beam output from the second stage.

DESCRIPTION

Figure 1:
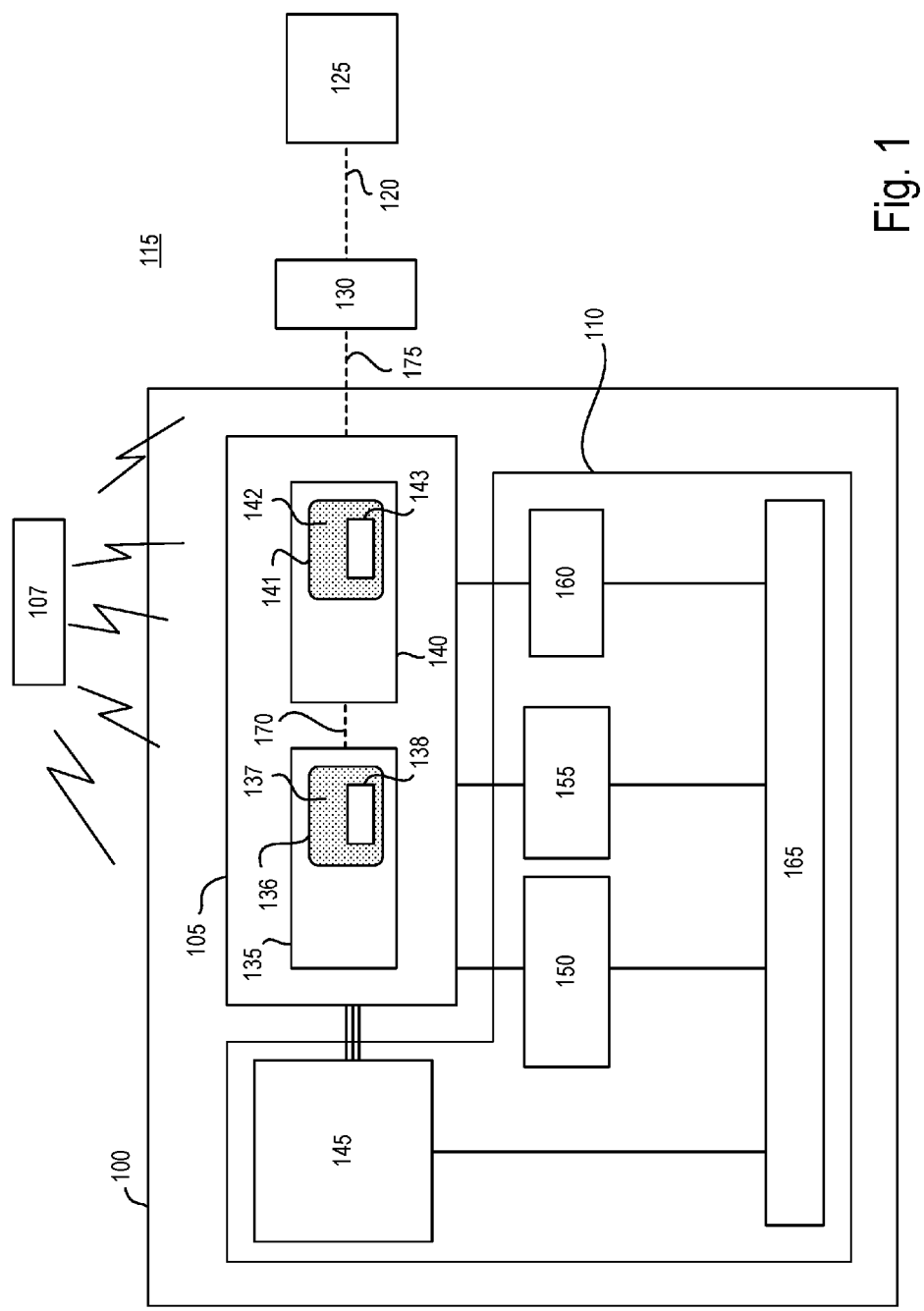
FIG. 1 is a block diagram of a gas discharge light source that produces a pulsed light beam directed to an output apparatus.
Figure 2:
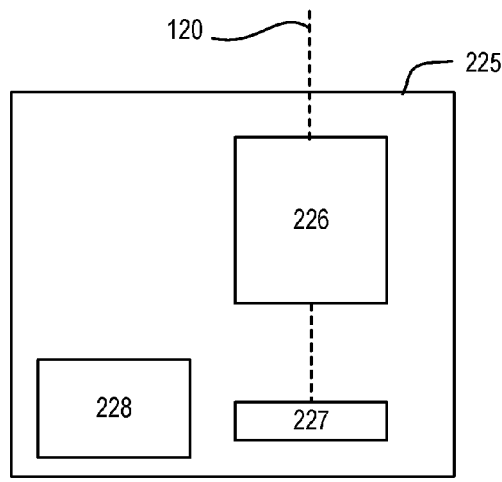
FIG. 2 is a block diagram of an exemplary output apparatus of FIG. 1.

Referring to FIG. 1, a gas discharge light source 100 includes a gas discharge system 105 and an exemplary gas adjustment system 110. The light source 100 is configured as a part of an optical system 115 that supplies a pulsed light beam 120 that is directed to an output apparatus 125 (such as a photolithography exposure apparatus 225 that patterns microelectronic features on a wafer, as shown in FIG. 2).

The gas discharge system 105 is a two-chamber system that includes a first stage 135 that produces a pulsed light beam 170 and a second stage 140 that produces a pulsed light beam 175. The pulsed light beam 175 can be directed through a beam preparation system 130 placed between the gas discharge light source 100 and the output apparatus 125 to form the pulsed light beam 120. The first stage 135 includes a first gas discharge chamber 136 that contains a gas mixture 137 that includes a gain medium, among other gases, and a first pulsed energy source 138 for supplying energy to the gain medium. Similarly, the second stage 140 includes a second gas discharge chamber 141 that contains a gas mixture 142 that includes a gain medium, among other gases, and a second pulsed energy source 143. The ingredients of the gas mixtures 137, 142 can be identical. Moreover, the concentrations of the various ingredients in each of the gas mixtures 137, 142 can be different and also can be adjusted, for example, in real time.

The gas mixture in a particular chamber includes a mixture of a gain medium and a buffer gas. The gain medium is the laser-active entity within the gas mixture, and it can be either a single atom or a molecule or a pseudo-molecule. Thus, a population inversion occurs in the gain medium via stimulated emission by pumping the gas mixture 137, 142 (and therefore the gain medium) with an electric discharge from the respective energy source 138, 143. The gain medium typically includes a noble gas and a halogen, while the buffer gas typically includes an inert gas. The noble gas includes, for example, argon, krypton, or xenon; the halogen includes, for example, fluorine; and the inert gas includes, for example, helium or neon.

The gas adjustment system 110 is designed to optimize or improve operating characteristics (or attributes) of the gas mixture in the gas discharge chamber 136, 141, for example, after the gas discharge chamber 136, 141 has been refilled with gas. The gas adjustment system 110 optimizes or improves these gas characteristics at least in part by estimating extreme values (for example, a minimum and maximum value) of operating parameters of the light source 100 while operating the gas discharge system 105 under a set of extreme test conditions, determining whether to adjust one or more operating characteristics (or attributes) of the light source 100 based on the estimated extreme values, and adjusting the operating characteristic of the light source 100 if it is determined that such operating characteristic should be adjusted.

An operating characteristic of the light source 100 (such as a characteristic of the gas mixture in the gas discharge chamber 136, 141) is adjusted by, for example, adjusting actuator settings that control such operating characteristics. For example, one operating characteristic of the gas discharge system 105 is a pressure of the gas mixture 137, 142 of the gas discharge chamber 136, 141 within the gas discharge system 105. The pressure of the gas mixture 137, 142 can be adjusted by making adjustments to a gas supply system 145. Another operating characteristic of the gas discharge system 105 is an optical feature (such as a spectral feature) of the pulsed light beam 170, 175. The spectral feature of the pulsed light beam 170, 175 can be adjusted by adjusting an optical magnification applied to a pulsed light beam of the first stage 135 of the gas discharge system 105. Moreover, the optical magnification can be adjusted by making adjustments to a spectral feature selection system 150.

As discussed, the gas adjustment system 110 analyzes and selects these adjustments based at least in part on estimates, measures, or observations of one or more operating parameters of the light source 100 while the light source 100 is operating under a set of extreme test conditions.

Moreover, the gas adjustment system 110 can additionally decouple the gas adjustment (or optimization) of the gas discharge chamber 136 from the gas adjustment (or optimization) of the gas discharge chamber 141 by, for example, performing gas optimization or adjustment of the gas discharge chamber 136 before performing gas optimization or adjustment of the gas discharge chamber 141.

The gas adjustment system 110 performs a gas optimization procedure in a time (for example, two minutes or less) that is improved over prior gas optimization procedures (which typically require six or more minutes to complete). The gas adjustment system 110 performs a gas optimization procedure that is more robust than prior gas optimization procedures. This means that the gas optimization procedure optimizes or improves the adjustments (for example, adjustments to pressure of the gas mixture 137, 142 in the respective gas discharge chamber 136, 141 or adjustments to a spectral property of the pulsed light beam 175 output from the second stage 140) made to the gas discharge system 105 in order to operate the gas discharge system 105 within acceptable or maximized margins of its operating parameters (such as an energy of the pulsed light beam 120 or a spectral feature of the pulsed light beam 120). Thus, the gas adjustment system 110 performs gas optimization while maximizing these margins of the operating parameters of the gas discharge system 105. For example, the gas discharge system 105 can operate for longer periods of time while maintaining a specified operating parameter, such as the output energy of the pulsed light beam 120, or a specified operating parameter, such as the output bandwidth of the pulsed light beam 120, while still compensating for disturbances 107 to the gas discharge system 105 that can alter these operating parameters. By doing this, the gas discharge system 105 performs more robustly and is better able to reject or compensate for disturbances 107 after the refill procedure than would be possible using prior gas optimization schemes.

Specifically, each energy source 138, 143 of the respective gas discharge chamber 136, 141 is activated by a pulsed signal, and the gas discharge chamber 136, 141 can therefore produce a pulsed amplified light beam under certain circumstances (with enough energy and/or optical feedback). For example, the gas discharge chamber 136 produces an intermediate or seed light beam 170 and the gas discharge chamber 141 produces an output light beam 175, which is directed to the beam preparation system 130 to produce the pulsed light beam 120. As the energy is discharged through the energy source 138, 143, to produce the pulsed light beams 170, 175, respectively, some of the halogen gas, fluorine in the case of ArF or KrF gain media, is depleted. This causes a decrease in operating efficiency from the light source 100, and such a decrease in operating efficiency can be seen, for example, as an increase in energy required to be supplied to the energy sources 138, 143 to create a desired energy in the pulsed light beam 120. Because of this, steps must be taken to replenish the lost halogen gas so that the energy supplied to the energy sources 138, 143 remains below an upper limit (that is determined by constraints of the hardware) and the light source 100 continues to operate properly.

One way to replenish the lost halogen gas is with a full replenishment of the gas mixture 137, 142 in the gas discharge chamber 136, 141. Such a full replenishment is referred to as a refill, in which all of the gas mixture 137, 142 is replaced while the light source 100 is not producing the pulsed light beam 120. During the refill, the contents of the gas mixture 137, 142 are returned to a desired mix, concentration, and/or pressure. For example, the new gas is introduced into the chamber 136, 141 in an amount that is sufficient to arrive at a particular pressure and concentration of the halogen gas (for example, fluorine). After a refill, the operation of the light source 100 should begin in as close to an optimum set of operating parameters as possible, to provide the best gas characteristics (or attributes) for initial operation of the light source 100. In this way, the light source 100 can begin operation at its most efficient (or as close to most efficient) set of operating parameters, allowing for longer operation of the light source 100 before another refill is required.

Details about the gas optimization procedures are provided following a description of the design of the optical system 115.

The gas adjustment system 110 includes a gas supply system 145; a spectral feature selection system 150, an energy control system 155, a monitoring system 160; and a control system 165. The gas supply system 145 includes one or more sources of gas; conduits for supplying the gas to one or more of the gas discharge chambers 136, 141; and one or more gas control valves between the gas sources and the gas discharge chambers 136, 141 for controlling a rate of flow of the gases into and out of the gas discharge chambers 136, 141.

The control system 165 is coupled to the gas supply system 145, the spectral feature selection system 150, the energy control system 155, and the monitoring system 160. Coupling between the control system 165 and these various other systems external to the control system 165 can be by a direct or physical connection (for example, wired) or by a wireless connection so that information can be freely passed between the control system 165 and that particular external system. The control system 165 can additionally be coupled to one or more of: other devices of the gas discharge light source 100, devices of the beam preparation system 130, and/or devices within the output apparatus 125. The control system 165 can include other systems that monitor and control other aspects of the gas discharge light source 100, such as, for example, another system for monitoring a spectral feature of the pulsed light beam 120 or for controlling a spectral feature of the pulsed light beam 120 during operation of the light source 100 or even while the light source 100 is offline. The control system 165 is configured to provide a signal to activate each energy source 138, 143 of respective gas discharge chamber 136, 141.

Additionally, although the control system 165 is represented as a box in which all of the components appear to be co-located, it is possible for the control system 165 to be made up of components that are physically remote from each other.

Referring to FIG. 2, the output apparatus 125 can be the photolithography exposure apparatus 225. The exposure apparatus 225 includes an optical arrangement that includes an illuminator system 226 having, for example, one or more condenser lenses, a mask, and an objective arrangement through which the pulsed light beam 120 is directed on its way to the wafer 227. The mask is movable along one or more directions, such as along an axis of the pulsed light beam 120 or in a plane that is perpendicular to the axis. The objective arrangement includes, for example, a projection lens, and enables the image transfer to occur from the mask to the photoresist on the wafer 227. The illuminator system 226 adjusts the range of angles for the light beam 120 impinging on the mask. The illuminator system 226 also homogenizes (makes uniform) the intensity distribution of the light beam 120 across the mask. The exposure apparatus 225 can include, among other features, a lithography controller 228, air conditioning devices, and power supplies for various electrical components. The lithography controller 228 controls, among other things, how layers are printed on the wafer 227.

Figure 3:
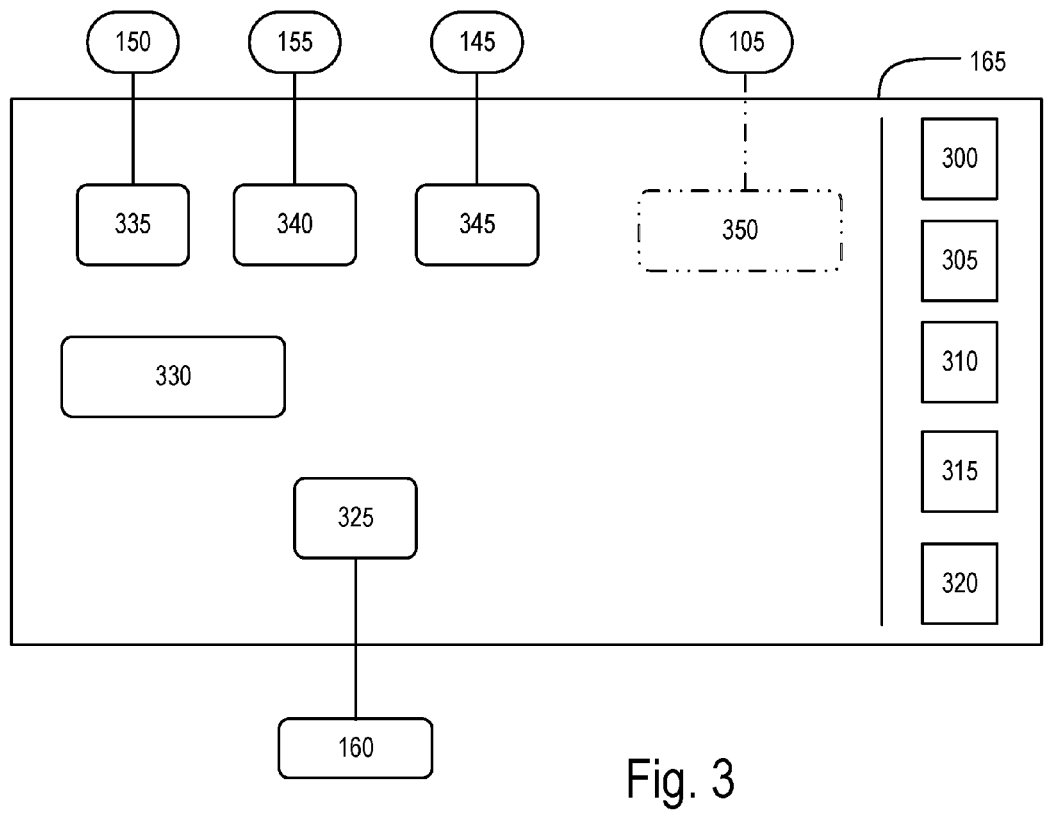
FIG. 3 is a block diagram of an exemplary control system of the gas discharge light source of FIG. 1.

Referring to FIG. 3, in general, the control system 165 includes one or more of digital electronic circuitry, computer hardware, firmware, and software. The control system 165 includes memory 300, which can be read-only memory and/or random access memory. Storage devices suitable for tangibly embodying computer program instructions and data include all forms of non-volatile memory, including, by way of example, semiconductor memory devices, such as EPROM, EEPROM, and flash memory devices; magnetic disks such as internal hard disks and removable disks; magneto-optical disks; and CD-ROM disks. The control system 165 can also include one or more input devices 305 (such as a keyboard, touch screen, microphone, mouse, hand-held input device, etc.) and one or more output devices 310 (such as a speaker or a monitor).

The control system 165 includes one or more programmable processors 315, and one or more computer program products 320 tangibly embodied in a machine-readable storage device for execution by a programmable processor (such as the processors 315). The one or more programmable processors 315 can each execute a program of instructions to perform desired functions by operating on input data and generating appropriate output. Generally, the processor 315 receives instructions and data from memory 300. Any of the foregoing may be supplemented by, or incorporated in, specially designed ASICs (application-specific integrated circuits).

The control system 165 includes, for example, various processing systems such as a processing system 325 for receiving the data from the monitoring system 160 and a processing system 330 for analyzing this data and deciding what sort of action should occur. Other processing systems include: a spectral feature processing system 335 for interfacing with the spectral feature selection system 150; an energy processing system 340 for interfacing with the energy control system 155; and a gas maintenance processing system 345 interfacing with the gas supply system 145. The data that flows between the various output processing systems 335, 340, 345 and the spectral feature selection system 150, the energy control system 155, and the gas supply system 145 is determined by the control system 165 based on the decision output from the analysis processing system 330.

Each of these processing systems can be a set of computer program products executed by one or more processors such as the processors. The control system 165 can include other processing systems (represented generically as box 350) for performing other tasks not related to those discussed herein.

Figure 4:
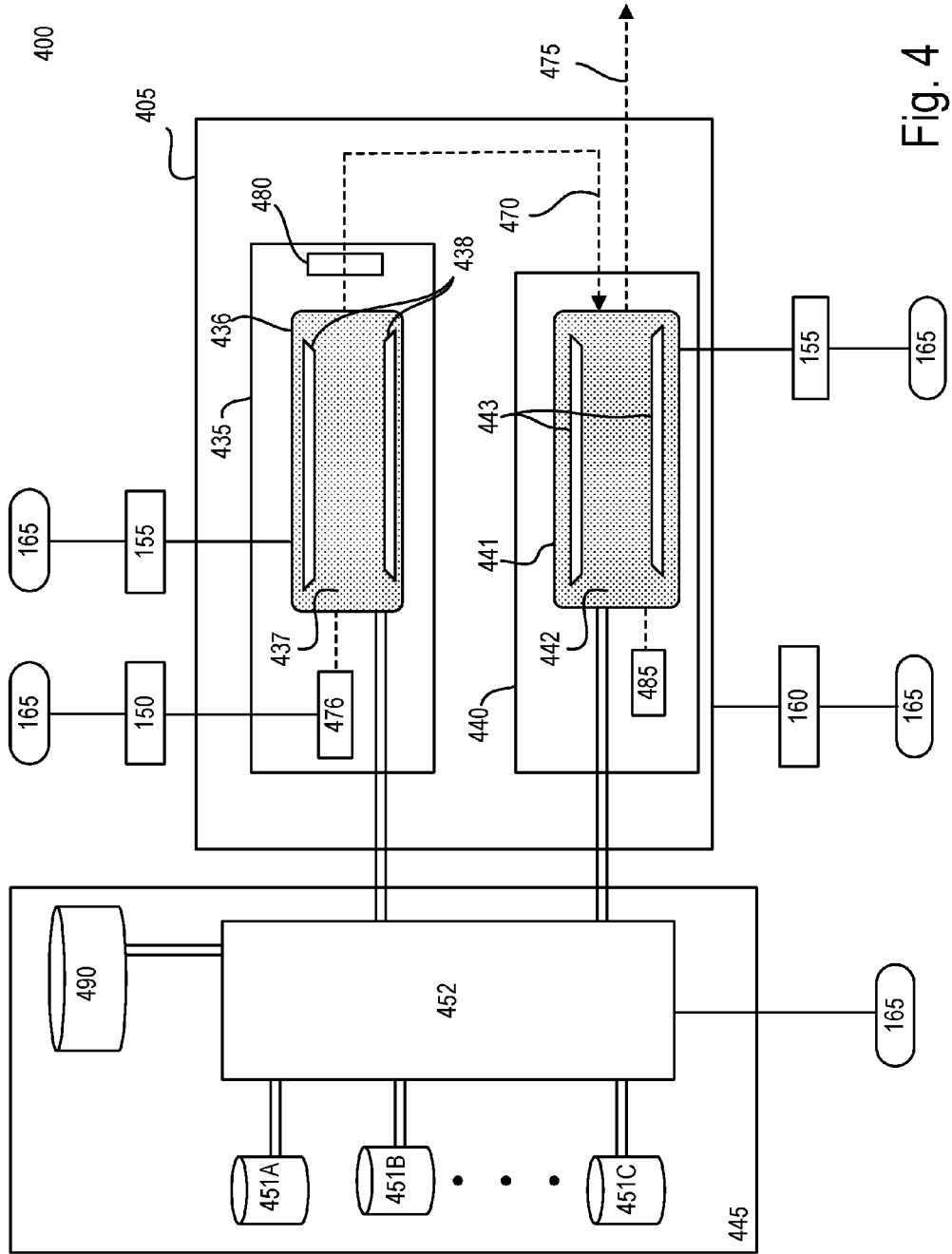
FIG. 4 is a block diagram of an exemplary gas discharge light source that can be used in FIG. 1.

Referring to FIG. 4, an exemplary gas discharge system 405 is shown. The gas discharge system 405 includes a master oscillator (MO) 435 as its first stage 135 and a power amplifier (PA) 440 as its second stage 140. The MO 435 includes a MO gas discharge chamber 436 and the PA 440 includes a PA gas discharge chamber 141. The MO gas discharge chamber 436 includes two elongated electrodes 438 that provide a source of pulsed energy 138 to the gas mixture 437 within the MO gas discharge chamber 436. The PA gas discharge chamber 441 includes two elongated electrodes 443 that provide a source of pulsed energy 143 to the gas mixture 442 within the PA gas discharge chamber 441.

The master oscillator (MO) 435 provides a pulsed amplified light beam (called a seed light beam) 470 to the power amplifier (PA) 440. The MO gas discharge chamber 436 houses the gas mixture 437 that includes a gain medium in which amplification occurs and the MO 435 includes an optical feedback mechanism such as an optical resonator. The optical resonator is formed between a spectral optical system 476 on one side of the MO gas discharge chamber 436 and an output coupler 480 on a second side of the MO gas discharge chamber 436. The MO gas discharge chamber 436 also includes a fan for circulating the gas mixture 437 between the electrodes 438.

The PA gas discharge chamber 441 houses the gas mixture 442 that includes a gain medium in which amplification occurs when seeded with the seed light beam 470 from the MO 435. If the PA 440 is designed as a regenerative ring resonator then it is described as a power ring amplifier (PRA), and in this case, enough optical feedback can be provided from the ring design. The PA 440 can also include a beam return (such as a reflector) 485 that returns (via reflection, for example) the light beam back into the PA gas discharge chamber 441 to form a circulating and looped path (in which the input into the ring amplifier intersects the output out of the ring amplifier). The PA gas discharge chamber 441 includes a fan for circulating the gas mixture 442 between the electrodes 443. The seed light beam 470 is amplified by repeatedly passing through the PA 440.

The MO 435 enables fine tuning of spectral features such as the center wavelength and the bandwidth of the light beam 470 at relatively low output pulse energies (when compared with the output of the PA 440). Specifically, spectral features of the seed light beam 470 are determined by the configuration of the MO 435, and these spectral features can be adjusted by adjusting the light beam 470 that is produced within the MO 435. The PA 440 receives the output (the seed light beam 470) from the MO 435 and amplifies this output in the pulsed light beam 475 in order to attain the necessary powers in the pulsed light beam 120 that is output to use in the output apparatus 125 (for example, for photolithography).

The gas mixture (for example, gas mixture 437, 442) used in the discharge chamber 436, 441, respectively, can be a combination of suitable gases for producing an amplified light beam 470, 475 around the required wavelengths and bandwidth. For example, the gas mixture 437, 442 can include argon fluoride (ArF), which emits light at a wavelength of about 193 nm, or krypton fluoride (KrF), which emits light at a wavelength of about 248 nm.

The gas supply system 445 includes one or more gas sources 451A, 451B, 451C and a valve system 452. The gas sources can be, for example, sealed gas bottles and/or canisters. As discussed above, each of the gas discharge chambers 436, 441 contains a mixture of gases (a gas mixture 437, 442). As an example, the gas mixture 437, 442 can contain a halogen, for example, fluorine, along with other gases such as argon, neon, and possibly others in different partial pressures that add up to a total pressure P. Thus, the one or more gas sources 451A, 451B, 451C are connected to the MO gas discharge chamber 436 and the PA gas discharge chamber 441 through a set of valves within the valve system 452. In this way, gas can be injected into the gas discharge chamber 436, 441 with specific relative amounts of components of the gas mixture. For example, if the gain medium used in the gas discharge chambers 436, 441 is argon fluoride (ArF), then one of the gas sources 451A can contain a mixture of gases including the halogen fluorine, the noble gas argon, and one or more other rare gases such as buffer gases (inert gas such as neon). This sort of mixture can be referred to as a tri-mix. In this example, another of the gas sources 451B can contain a mixture of gases including argon and one or more other gases but none of the fluorine. This sort of mixture can be referred to as a bi-mix. Although three gas sources 451A, 451B, 451C are shown, it is possible for the gas supply system 445 to have fewer than three or greater than three gas sources.

The control system 165 can send one or more signals to the valve system 452 to cause the valve system 452 to transfer gases from specific gas sources 451A, 451B, 451C into the gas discharge chambers 436, 441 in a refill or an inject scheme. Alternatively, or additionally, the control system 165 can send one or more signals to the valve system 452 to cause the valve system 452 to bleed gas from the gas discharge chambers 436, 441 when necessary, and such bled gas can be vented to a gas dump represented as 490.

During operation of a gas discharge light source 400, the fluorine of the argon fluoride molecule (which provides the gain medium for light amplification) within the gas discharge chambers 436, 441 is consumed and over time this reduces the amount of light amplification (and therefore the energy of the amplified light beam 470, 475) produced by the gas discharge chamber 436, 441. Moreover, during operation of the gas discharge light source 400, contaminants can enter the gas discharge chambers 436, 441. Accordingly, it is necessary to either inject gases from one or more of the gas sources 451A, 451B, 451C into the gas discharge chambers 436, 441 in order to flush contaminants out of the gas discharge chambers 436, 441, or to perform a refill operation.

When a refill operation is performed on the gas discharge chambers 436, 441, all of the gas in each of the gas discharge chambers 436, 441 is replaced by, for example, emptying the gas discharge chamber 436, 441 (by bleeding the gas mixture out to the gas dump 490) and then refilling that gas discharge chamber 436, 441 with a fresh gas mixture. The refill is performed with the goal of obtaining a specific pressure and concentration of fluorine in each gas discharge chamber 436, 441.

When an injection operation is performed on the gas discharge chambers 436, 441, the gas discharge chambers 436, 441 are not emptied or are only bled a small amount before a gas mixture is injected into the gas discharge chambers 436, 441. Refill operations and injection schemes are considered to be gas maintenance schemes applied to the gas discharge system (105 or 405).

A plurality of gas sources 451A, 451B, 451C are needed because the fluorine in the gas source 451A is at a particular partial pressure that is typically higher than that desired for operation of the light source 400. In order to add the fluorine to the MO gas discharge chamber 436 or to the PA gas discharge chamber 441 at a desired lower partial pressure, the gas in the gas source 451A can be diluted, and the non-halogen containing gas in the gas source 451B can be used for this purpose.

Although not shown, the valves of the valve system 452 can include a plurality of valves assigned to each of the gas discharge chambers 436, 441; for example, an injection valve that allows gas to pass into and out of each gas discharge chamber 436, 441 at a first rate, and a chamber fill valve that allows gas to pass into and out of each gas discharge chamber 436, 441 at a second rate that is distinct from (for example, faster) the first rate.

Figure 5:
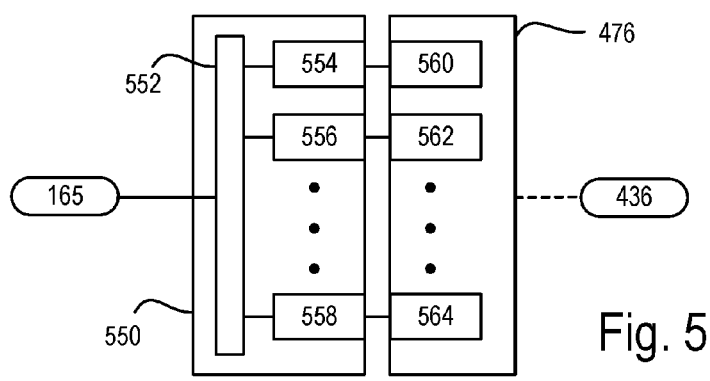
FIG. 5 is a block diagram of an exemplary module of a spectral feature selection system that can be used in the gas discharge light source of FIG. 1 or 4.

Referring to FIG. 5, an exemplary module 550 of the spectral feature selection system 150 is shown. In this example, the spectral feature module 550 couples to light from the light source 100 (such as light from the gas discharge chamber 436). In some implementations, the spectral feature module 550 includes the spectral optical system 476, which receives the light in the master oscillator 435 to enable the fine tuning of the parameters such as wavelength and bandwidth of the seed light beam 170 from the first stage 135 (such as the light beam 470 that is output from the master oscillator 435).

The spectral feature module 550 can include a controller such as spectral feature controller 552 that includes electronics in the form of any combination of firmware and software. The controller 552 is connected to one or more actuation systems such as spectral feature actuation systems 554, 556, 558. While three actuation systems are shown, there can be fewer or greater than three actuation systems. Each of the actuation systems 554, 556, 558 can include one or more actuators that are connected to respective optical features 560, 562, 564 of the spectral optical system 476. The optical features 560, 562, 564 are configured to adjust particular characteristics of the generated light beam 470 to thereby adjust the spectral feature of the light beam 470. The controller 552 receives a control signal from the control system 165 (as discussed below), the control signal including specific commands to operate or control one or more of the actuation systems 554, 556, 558. The actuation systems 554, 556, 558 can be selected and designed to work together, that is, in tandem. Moreover, each of the actuation systems 554, 556, 558 can be optimized to respond to a particular class of disturbances or modifications to the spectral feature. Together such coordination and cooperation can be employed by the control system 165 to hold or maintain the spectral feature (such as the wavelength or bandwidth) at a desired setpoint or at least within a desired range around a setpoint, even though the light source 100 may be subjected to a wide array disturbances. Or, the coordination and cooperation can be employed by the control system 165 to modify the spectral feature (such as the bandwidth) to correct for errors in physical features formed on the wafer 227.

Figure 6:
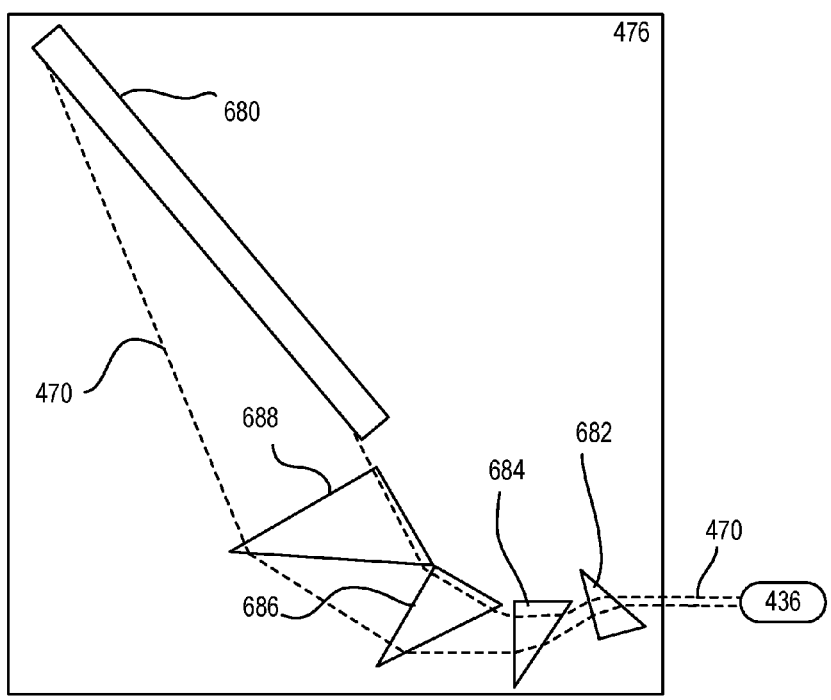
FIG. 6 is a block diagram of an exemplary spectral optical system of the exemplary module of FIG. 5.

Each optical feature 560, 562, 564 is optically coupled to the light beam 470 produced by the first stage 135 (the MO 435). In some implementations, the spectral optical system 476 is a line narrowing module such as that shown in FIG. 6, which is a block diagram of exemplary optical components. The line narrowing module includes as the optical features 560, 562, 564 dispersive optical elements such as a reflective grating 680 and refractive optical elements such as prisms 682, 684, 686, 688, one or more of which can be rotatable. The respective actuation systems for the actuatable optical features such as the grating 680, and one or more of the prisms 682, 684, 686, 688 are not shown in FIG. 6.

Each of the actuators of the actuation systems 554, 556, 558 is a mechanical device for moving or controlling the respective optical features 560, 562, 564 of the spectral optical system 476. The actuators receive energy from the module 552, and convert that energy into some kind of motion imparted to the optical features 560, 562, 564 of the spectral optical system 476. For example, actuation systems can be force devices (to apply forces to regions of the grating) and rotation stages for rotating one or more of the prisms of the beam expander. The actuation systems 554, 556, 558 includes any device or devices capable of causing an element to move, such as, for example, motors such as stepper motors, valves, pressure-controlled devices, piezoelectric devices, linear motors, hydraulic actuators, and voice coils.

It is possible that the spectral feature module 550 includes only one actuation system coupled to one optical feature of the spectral optical system, while the other optical features of the spectral optical system remain unactuated. For example, in FIG. 6, the line narrowing module can be set up so that only one of the prisms (such as the prism 682) is actuated by coupling with its actuation system, and the prism 682 can be movable under the control of a piezoelectric device. For example, the prism 682 can be mounted on a stage that is movable under the control of the piezoelectric device, which is controlled by the controller 552.

The energy control system 155 is connected to the energy sources 138, 143 of the first and second stages 135, 140 of the gas discharge system 105. In this way, the energy control system 155 can be used for controlling a voltage to the electrodes 438, 443 of the gas discharge chambers 436, 441, respectively.

Figure 7:
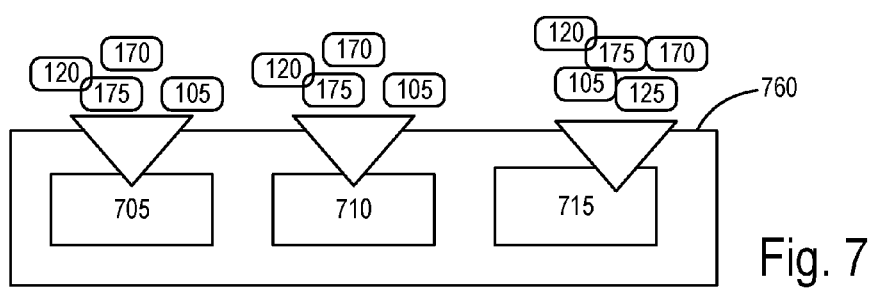
FIG. 7 is a block diagram of an exemplary monitoring system of the gas discharge light source of FIGS. 1 and 4.

Referring to FIG. 7, an exemplary monitoring system 760 is shown. The monitoring system 760 includes a set of sub-units 705, 710, 715 that are tailored for observing or measuring aspects of the gas discharge system 105. For example, the monitoring system 760 includes an energy sub-unit 705; a spectral feature sub-unit 710; and a general sub-unit 715. The energy sub-unit 705 observes, measures, or estimates an energy of one or more amplified light beams such as light beams 170, 175, 120 produced by or within the gas discharge system 105 and is configured to output a value or set of values that indicates this determined energy. The spectral feature sub-unit 710 observes, measures, or estimates one or more spectral features (such as wavelength and bandwidth) of one or more amplified light beams such as light beams 170, 175, 120 produced by or within the gas discharge system 105 and is configured to output a value or set of values that indicate these determined spectral features. The general sub-unit 715 can be configured to observe, estimate, or measure other operating characteristics of the gas discharge system 105 or of the output apparatus 125.

In other implementations, the spectral feature selection system 150 includes other modules (for example, a timing module) for controlling one or more spectral features of the pulsed light beam 120.

Figure 8:
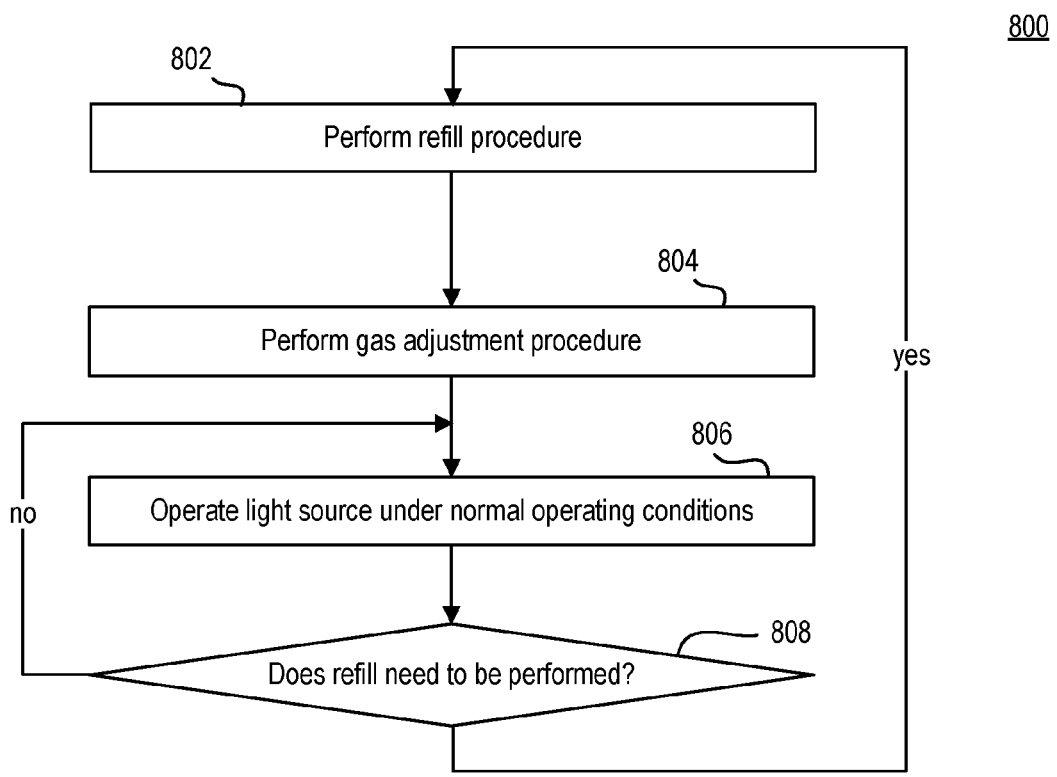
FIG. 8 is a flow chart of an exemplary procedure performed by the gas discharge light source of FIG. 1 or 4.

Referring to FIG. 8, a procedure 800 is performed by the gas discharge light source 100 after a decision is made to perform a refill procedure on the chambers 136, 141. The refill procedure is performed [802]. During the refill procedure [802], all of the gas in the chambers 136, 141 is replaced. Thus, the refill procedure [802] can include the removal of all of the remaining gas in the chambers 136, 141 followed by filling each of the chambers 136, 141 with gas from the gas supply system 145. For example, the control system 165 sends a signal to the gas supply system 145 to fill the gas discharge chamber 136 with a first gas mixture 137 and to fill the gas discharge chamber 141 with a second gas mixture 142. The control system 165 can send a signal to the valve system 452 to operate a first set of valves to enable a specific recipe of gas to flow from one or more gas sources 451A-451C to the gas discharge chamber 436 and to operate a second set of valves to enable a specific recipe of gas to flow from one or more gas sources 451A-451C to the gas discharge chamber 441.

As discussed above, after the refill [802] is completed, an attempt is made to arrive at specific operating characteristics (such as attributes) of the gas mixture 137, 142 in the respective chamber 136, 141. Thus, the gas adjustment system 110 is used to perform a gas adjustment procedure [804]. During the gas adjustment procedure [804], the gas adjustment system 110 automatically adjusts (for example, to optimize or improve) operating characteristics of the gas discharge system 105, such as, for example, the attributes or features of the gas in the gas discharge chambers 136, 141 and/or attributes of the pulsed light beams 170, 175 output from respective gas discharge chambers 136, 141.

Once the gas adjustment procedure [804] is completed, then the gas discharge light source 100 is operated under normal conditions [806] to produce the pulsed light beam 120 that is directed to the output apparatus 125. During operation of the gas discharge light source 100, a determination is regularly made as to whether a refill procedure [802] should be performed [808]. For example, the control system 165 can analyze information about aspects of the gas discharge light source 100 during operation under normal conditions [806] to determine whether a refill procedure [802] should be performed. As another example, the control system 165 can determine that a refill procedure [802] is performed automatically according to a schedule, for example, a refill can be performed after so many pulses of light have been produced by the gas discharge light source 100. In one example, the control system 165 determines that the refill procedure [802] is performed automatically once 2 billion pulses of the light beam 120 are produced after the last refill procedure [802].

Figure 9:
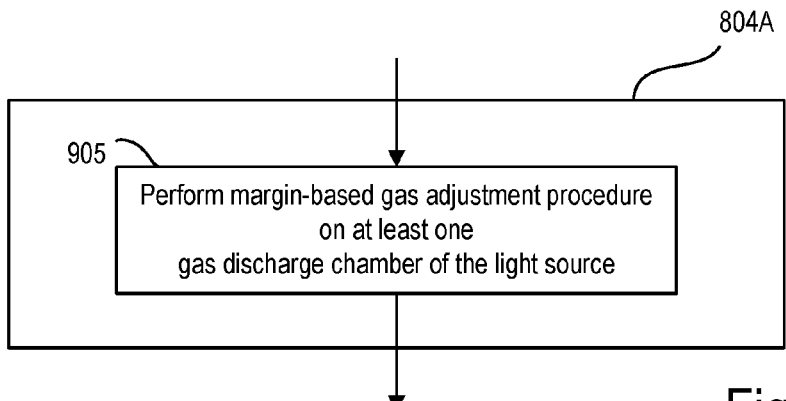
FIGS. 9 and 10 are flow charts of exemplary procedures performed by the gas discharge light source of FIG. 1 or 4 for performing a gas adjustment procedure.

Referring to FIG. 9, an exemplary gas adjustment procedure [804A] is performed. In the gas adjustment procedure [804A], a margin-based gas adjustment procedure [905] is performed on at least one gas discharge chamber 136, 141 of the gas discharge system 105. A margin-based gas adjustment procedure is a procedure that probes or measures extreme values of operating parameters of the gas discharge light source 100 while operating the light source 100 under a set of extreme test conditions. Thus, in the gas adjustment procedure [804A], the margin-based gas adjustment procedure [905] could be performed on just one of the gas discharge chambers 136, 141, such as, for example, the gas discharge chamber 141 of the second stage 140 or on both of the gas discharge chambers 136 and 141.

Figure 10:
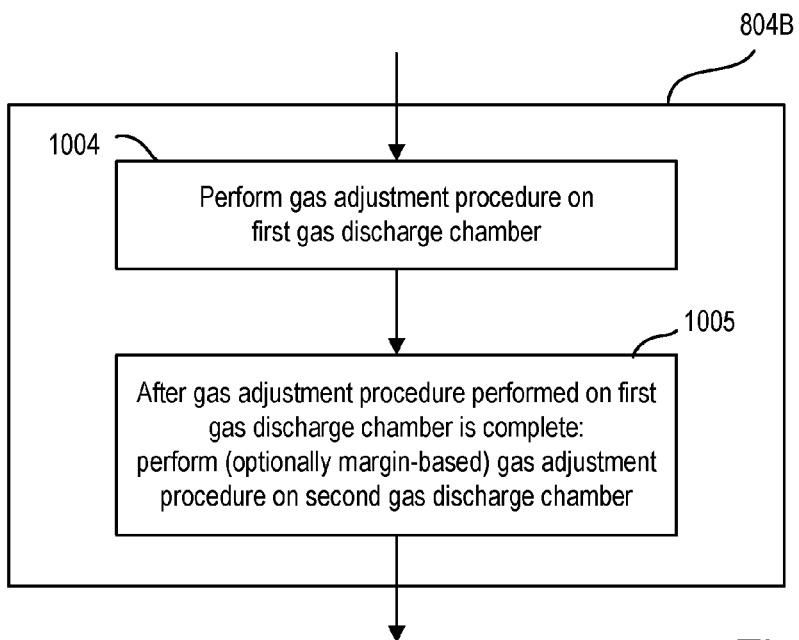

In other implementations, as shown in FIG. 10, an exemplary gas adjustment procedure [804B] is performed. In the gas adjustment procedure [804B], a first gas adjustment procedure is performed on the first gas discharge chamber 136 [1004], and after this first gas adjustment procedure [1004] is completed, then a second gas adjustment procedure [1005] is performed on the second gas discharge chamber 141. The second gas adjustment procedure [1005] can be a margin-based gas adjustment procedure such as the procedure [905]. Specifically, it is beneficial to perform and complete the gas adjustment procedure [1004] on the first gas discharge chamber 136 prior to performing the gas adjustment procedure [1005] on the second gas discharge chamber 141. This is because the output (the pulsed light beam 170) from the first gas discharge chamber 136 is fed into and used to seed the second gas discharge chamber 141; thus, any changes to the operating characteristics of the first gas discharge chamber 136 could alter or change the operating characteristics of the second gas discharge chamber 141. On the other hand, it is unlikely that the alteration of operating characteristics of the second gas discharge chamber 141 would have a large impact or effect on the operating characteristics of the first gas discharge chamber 136. Accordingly, in this exemplary gas adjustment procedure [804B], the adjustment procedures for the gas discharge chambers 136, 141 are decoupled from each other.

Figure 11:
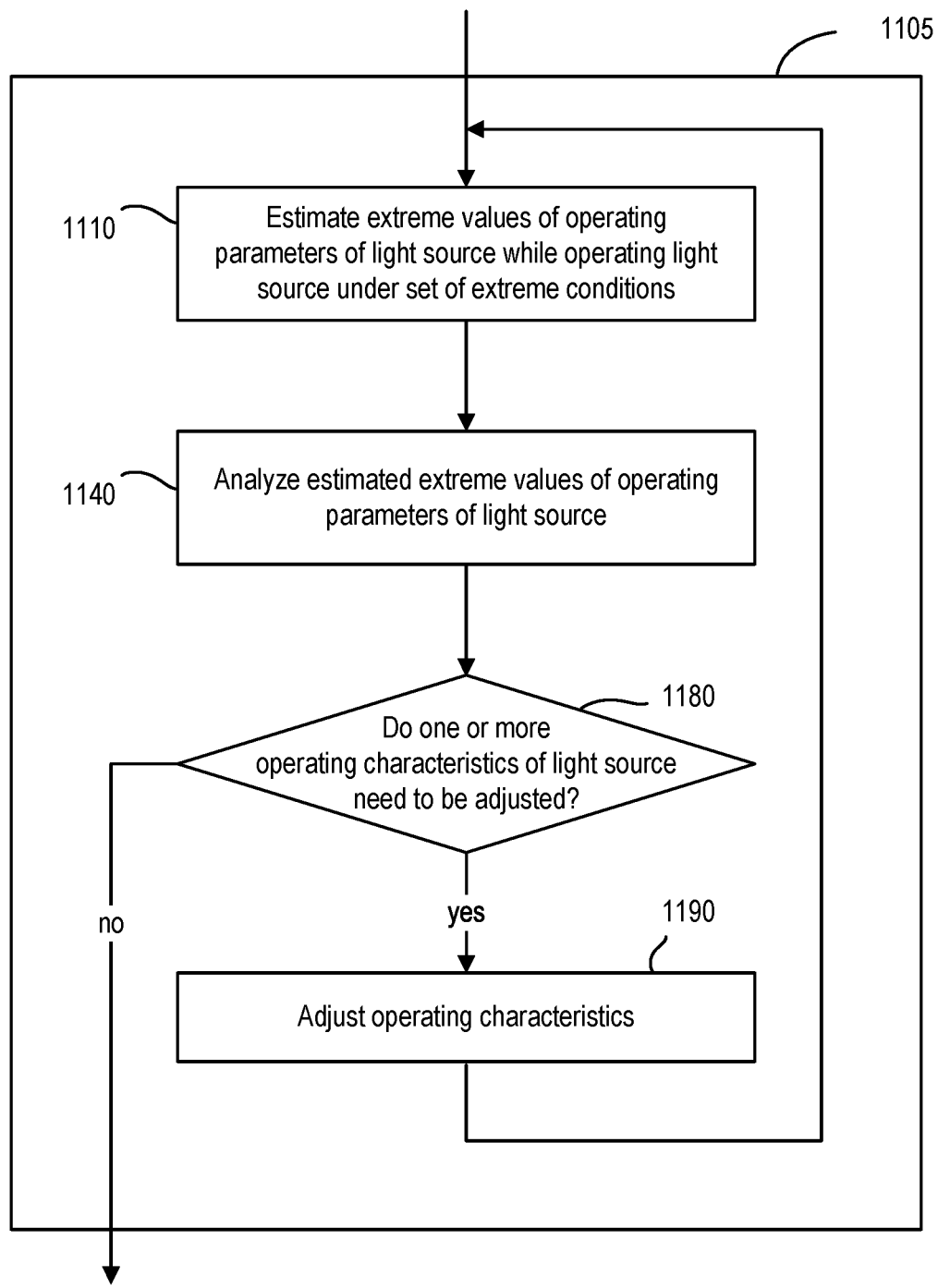
FIG. 11 is a flow chart of an exemplary procedure performed by the gas discharge light source of FIG. 1 or 4 for performing a gas adjustment procedure.

Referring to FIG. 11, an exemplary margin-based gas adjustment procedure [1105] is described. The procedure [1105] is performed by the gas discharge light source 100, specifically under control of the control system 165. Extreme values (margins) of operating parameters of the light source 100 are estimated while operating the light source 100 under a set of extreme test conditions [1110]. For example, a maximum or a minimum or both a maximum and a minimum of an operating parameter, of the light source 100 can be estimated. Exemplary operating parameters include an energy of a pulsed amplified light beam 170 or 175 and a spectral property (such as wavelength or bandwidth) of the pulsed amplified light beam 170 or 175. The control system 165 analyzes the estimated extreme values [1140], and based on this analysis, determines whether one or more operating characteristics of the light source 100 need to be adjusted [1180]. If the control system 165 determines that one or more operating characteristics of the light source 100 need to be adjusted [1180], then the control system 165 sends one or more signals to other components (such as the gas supply system 145, the spectral feature selection system 150, or the energy control system 155) of the gas discharge light source 100 to thereby adjust the operating characteristics of the light source 100 [1190].

Figure 12:
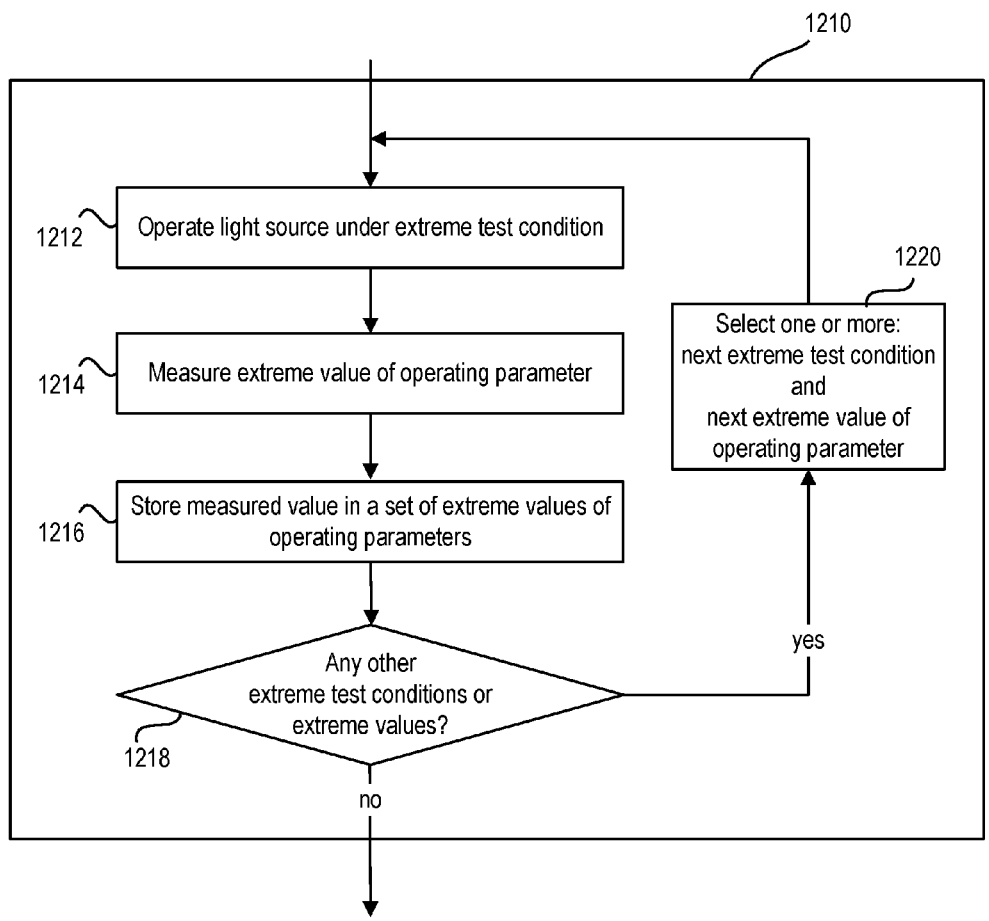
FIG. 12 is a flow chart of an exemplary procedure performed by the gas discharge light source of FIG. 1 or 4 for estimating extreme values of operating parameters of the light source.

Referring to FIG. 12, an exemplary procedure [1210] is performed for estimating the extreme values (margins) of the operating parameters of the light source 100 while operating the light source 100 under a set of extreme test conditions [1110].

The procedure [1210] begins by operating the light source 100 under an extreme test condition out of the set of possible extreme test conditions [1212]. The light source 100 can be operated as follows. The control system 165 sends a signal to the energy control system 155, which interfaces with the energy sources 138, 143 of the first stage 135 and the second stage 140, respectively. The energy control system 155 supplies an electrical signal to the first energy source 138 in the form of a group of pulses (for example a burst) of energy to thereby cause the first energy source 138 to supply a group of pulses of energy to the first gas mixture 137, which, if sufficient energy is supplied and other requirements are met, produces the first pulsed amplified light beam 170, which is directed toward the second stage 140. Next, the energy control system 155 supplies an electrical signal to the second energy source 143 in the form of a group of pulses (for example, a burst) of energy to thereby cause the second energy source 143 to supply a group of pulses of energy to the second gas mixture 142. And, if sufficient energy is supplied, and other requirements are met, produces the second pulsed amplified light beam 175, which is directed toward the beam preparation system 130. One of the requirements that should be met in order to produce the second pulsed amplified light beam 175 is that a relative (or differential) timing between a specific pulse supplied to the first energy source 138 and the next pulse in time supplied to the second energy source 143 must be within a certain range so that the pulse of the first amplified light beam 170 is inside the chamber 141 at an appropriate time during which energy is being supplied to the second energy source 143.

Thus, the operation of the light source 100 is performed while following one of the extreme test conditions, and specific examples of extreme test conditions will be discussed following a complete discussion of the procedure [1210].

Next, the extreme value of the operating parameter is measured [1214]. For example, the monitoring system 160 can probe or measure the value of the operating parameter at its extreme end and the signal from the monitoring system 160 is provided to the control system 165. The control system 165 stores the measured value in a set of extreme values of operating parameters [1216] for example, inside memory 300 or inside some other storage device. The control system 165 determines whether there are any other extreme values to be measured for this particular extreme test condition or if there are any other extreme test conditions that must be probed [1218]. If there are other extreme values or other extreme test conditions that need to be probed [1218], then the control system 165 selects the next extreme value of an operating parameter to measure or selects the next extreme test condition in which to operate the light source 100 [1220]. In some implementations, two extreme values of each operating parameter are measured at two distinct extreme test conditions. Therefore the control system 165 would determine whether other extreme test conditions need to be probed [1218] and then select the next extreme test condition [1220] and the next extreme value of an operating parameter. If no other extreme test conditions or extreme values are required to be probed [1218], then the control system 165 can proceed to performing an analysis of all of the estimated extreme values of the operating parameters [1140].

Figure 13:
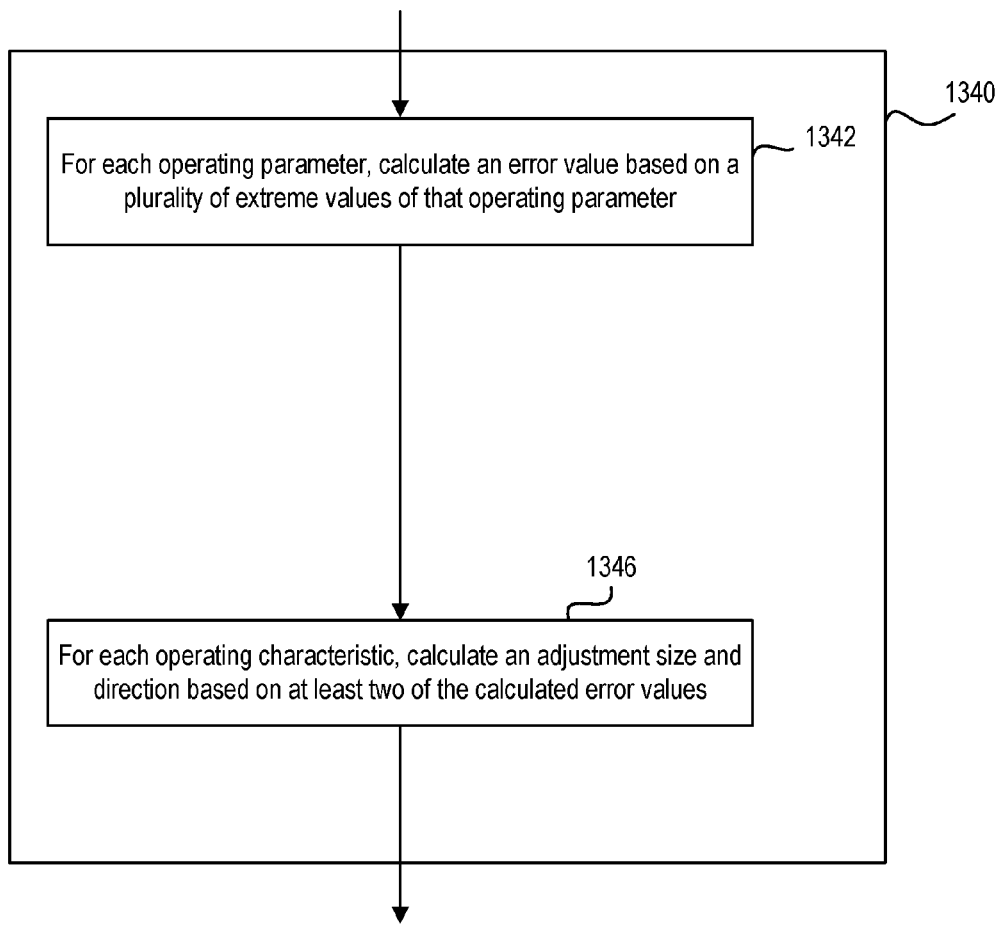
FIG. 13 is a flow chart of an exemplary procedure performed by the gas discharge light source of FIG. 1 or 4 for analyzing a set of estimated extreme values of operating parameters.

Referring to FIG. 13, an exemplary procedure [1340] is performed (for example, by the analysis processing system 330 of the control system 165) for analyzing the stored extreme values (margins) of the operating parameters of the light source 100 that were estimated during the procedure [1110]. For each operating parameter that is estimated during the procedure [1110], an error value is calculated based on the plurality of extreme values that were estimated for that operating parameter [1342]. For example, the error value could be a value that calculates a weighted average of all of the extreme values that were estimated during the procedure [1110] for that operating parameter.

The control system 165 (via the analysis processing system 330) calculates a size (and possibly direction) for an adjustment to be made to an operating characteristic based on the calculated error values [1346]. The control system 165 calculates the sizes of the adjustments on two or more operating characteristics simultaneously because both calculations require information about two or more of the calculated error values [1342].

Turning back to FIG. 11, as discussed above, the control system 165 analyzes the estimated extreme values [1140], and based on this analysis, determines whether one or more operating characteristics of the light source 100 need to be adjusted [1180]. This analysis can be two-fold. For example, if the analysis processing system 330 determined that the calculated error values are outside of a threshold range [1344], then the control system 165 may deem that the operating characteristics of the light source 100 are acceptable and therefore determine that the operating characteristics do not need to be adjusted [1180]. As another example, the analysis processing system 330 may analyze other operating features (such as pressure of the gas mixture or position of actuators) of the light source 100 to determine if any of these features are out of an acceptable range or are near an edge of the acceptable range, and if any of these operating features are out of an acceptable range or near an edge of the acceptable range, then the control system 165 deems that the operating characteristics of the light source 100 do not need to be adjusted [1180] because an adjustment of the operating characteristics would force these operating features out of an acceptable range.

Figure 14A:
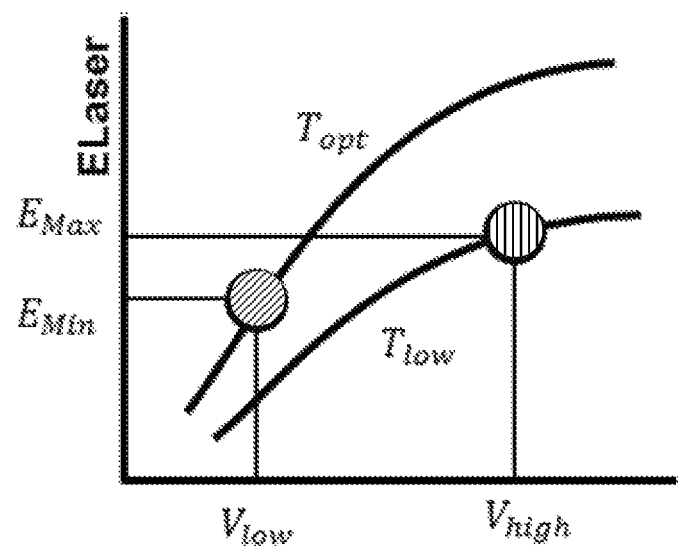
FIG. 14A is a graph showing an exemplary relationship between extreme test conditions and estimated extreme values of the operating parameter energy of the pulsed light beam output from one or more of the stages of the gas discharge light source of FIG. 1 or 4.
Figure 14B:
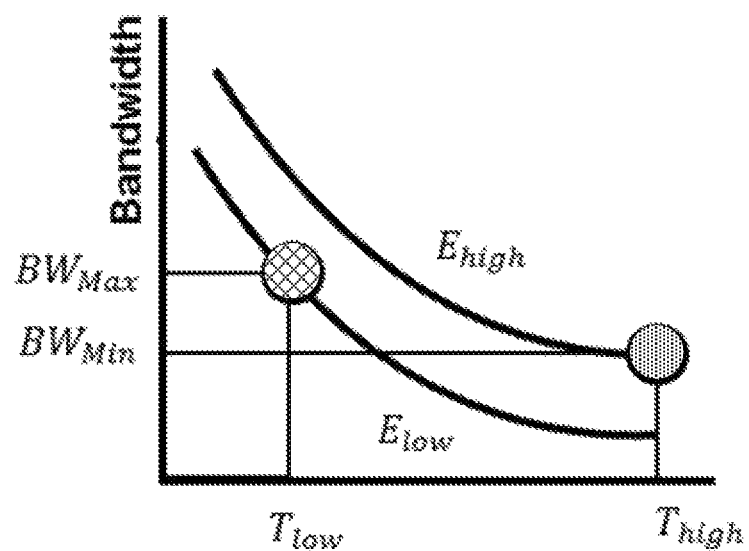
FIG. 14B is a graph showing an exemplary relationship between extreme test conditions and estimated extreme values of the operating parameter bandwidth of the pulsed light beam output from one or more of the stages of the gas discharge light source of FIG. 1 or 4.

Next, and with reference to FIGS. 14A and 14B, the procedure [1210] and the procedure [1340] are described for specific examples of extreme test conditions and extreme values of operating parameters.

For example, the procedure [1210] begins at [1212] by operating the light source 100 under the following extreme test condition shown in FIG. 14A: decreasing the energy in the electrical signal supplied to the first energy source 138 (such as, for example, decreasing a voltage V applied to the electrodes 438 or to both electrodes 443 and 438 to the value Vlow) while selecting an optimal or nearly optimal relative (or differential) timing (Topt) between pulses supplied to the first energy source 138 and pulses supplied to the second energy source 143, while maintaining an energy EMO of the first pulsed light beam 170 above a minimum value. The light source 100 is operated under this extreme test condition for a burst of pulses (for example, for tens or hundreds of pulses) [1212] and during this time, the control system 165 (via the monitoring system 160) measures an extreme value of the energy of the second pulsed light beam 175 [1214]. For example, the monitoring system 160 can measure or determine a minimum energy Emin of the second pulsed light beam 175 that is achievable in this extreme test condition. The monitoring system 160 can measure the minimum energy Emin for each pulse of the burst and determine an average of all of these measurements and that average can be the value that the control system 165 stores in memory 300 [1216].

Because there are additional extreme test conditions that need to be probed [1218], the control system 165 selects the next extreme test condition and next extreme value of the operating parameter [1220] and the procedure [1210] continues at [1212] by operating the light source 100 under the selected extreme test condition. The selected extreme test condition (shown in FIG. 14A) is: increasing the energy in the electrical signal supplied to the first energy source 138 (such as, for example, increasing a voltage V applied to the electrodes 438 or to both electrodes 443 and 438 to a value Vhigh) while selecting a non-optimal (or least optimal) differential timing (Tlow) between pulses supplied to the first energy source 138 and pulses supplied to the second energy source 143. The light source 100 is operated under this extreme test condition for a burst of pulses (for example, for tens or hundreds of pulses) [1212] and during this time, the control system 165 (via the monitoring system 160) measures another extreme value of the energy of the second pulsed light beam 175 [1214]. For example, the monitoring system 160 can measure or determine a maximum energy Emax of the second pulsed light beam 175 that is achievable in this extreme test condition. The monitoring system 160 can measure the maximum energy Emax for each pulse of the burst and determine an average of all of these measurements and that average can be the value that the control system 165 stores in memory 300 [1216].

Because there are additional extreme test conditions that need to be probed [1218], the control system 165 selects the next extreme test condition and next extreme value of the operating parameter [1220] and the procedure [1210] continues at [1212] by operating the light source 100 under the selected extreme test condition, which is shown in FIG. 14B. The selected extreme test condition is: decreasing the differential timing (to a low value Tlow) between pulses supplied to the first energy source 138 and pulses supplied to the second energy source 143 while supplying a minimum or lower energy Elow in the electrical signal supplied to the first energy source 138 or to both energy sources 138, 143 (such as, for example, applying a lowest voltage to the electrodes 438 and 443). The value of the lower energy Elow is selected such that the energy of the pulsed light beam 170 or 175 is below a lower threshold value. For example, the lower energy Elow can be selected such that the energy of the pulsed light beam 170 or 175 is at 8 milliJoules (mJ), which is lower than a nominal value of 10 mJ and lower than an exemplary threshold value of 8.1 mJ. The light source 100 is operated under this extreme test condition for a burst of pulses (for example, for tens or hundreds of pulses) [1212] and during this time, the control system 165 (via the monitoring system 160) measures an extreme value of the spectral property of the second pulsed light beam 175 [1214]. For example, the monitoring system 160 can measure or determine a maximum bandwidth BWmax of the second pulsed light beam 175 that is achievable in this extreme test condition. The monitoring system 160 can measure the maximum bandwidth BWmax for each pulse of the burst and determine an average of all of these measurements and that average can be the value that the control system 165 stores in memory 300 [1216].

In this example, there are additional extreme test conditions that need to be probed [1218], and therefore the control system 165 selects the next extreme test condition and the next extreme value of the operating parameter [1220] and the procedure [1210] continues at [1212] by operating the light source 100 under the selected extreme test condition, which is shown in FIG. 14B. The selected extreme test condition is: increasing the differential timing (to a high value Thigh) between pulses supplied to the first energy source 138 and pulses supplied to the second energy source 143 while supplying a maximum or higher energy (Ehigh) in the electrical signal supplied to the first energy source 138 or to both energy sources 138, 143 (such as, for example, applying a highest voltage to the electrodes 438 and 443). The value of the higher energy Ehigh is selected such that the energy of the pulsed light beam 170 or 175 is above an upper threshold value. For example, the higher energy Ehigh can be selected such that the energy of the pulsed light beam 170 or 175 is at 12 mJ, which is higher than the nominal value of 10 mJ and higher than the exemplary upper threshold value of 11.9 mJ. The light source 100 is operated under this extreme test condition for a burst of pulses (for example, for tens or hundreds of pulses) [1212] and during this time, the control system 165 (via the monitoring system 160) measures an extreme value of the spectral property of the second pulsed light beam 175 [1214]. For example, the monitoring system 160 can measure or determine a minimum bandwidth BWmin of the second pulsed light beam 175 that is achievable in this extreme test condition. The monitoring system 160 can measure the minimum bandwidth BWmin for each pulse of the burst and determine an average of all of these measurements and that average can be the value that the control system 165 stores in memory 300 [1216].

At this point in the example, four extreme values have been stored in memory 300 [1216]; namely, Emax, Emin, BWmax, and BWmin. And, the control system 165 (via the analysis processing system 330) proceeds to analyze these stored extreme values [1140]. Reference is made to the procedure [1340] of FIG. 13 when describing the analysis of these exemplary values.

For each operating parameter (either bandwidth BW or output energy E), an error value (BWError or EError, respectively) is calculated [1342]. Moreover, the error value of one operating parameter (such as bandwidth BW) is based on the extreme values obtained for both of the operating parameters (thus, based on not only BWmax and BWmin but also Emax and Emin). In this way, the analysis takes into account the coupling between the operating parameters and the operating characteristics. This coupling means that by changing one operating parameter, the other operating parameter may change or either or both of the operating characteristics may be impacted. By performing an analysis that takes such coupling into account, overshoots in adjustments to the operating characteristics can be avoided or reduced in occurrence.

In some implementations, the error value for the energy EError can be calculated relative to a nominal output energy Enom as follows:

$$EError = \begin{cases} \frac{Emax + Emin}{2} - Enom, & \text{if } Emax > Emin \\ 0, & \text{if otherwise} \end{cases};$$

and the error value for the bandwidth BWError can be calculated relative to a nominal bandwidth BWnom as follows:

$$BWError = \begin{cases} \frac{BWmax + BWmin}{2} - BWnom, & \text{if } BWmax > BWmin \\ 0, & \text{if otherwise} \end{cases},$$

where Enom is the nominal output energy of the pulsed light beam 170 or 175 and BWnom is the nominal bandwidth of the pulsed light beam 170 or 175. In one example, the nominal output energy of the pulsed light beam 170 or 175 is 10 mJ and the nominal bandwidth of the pulsed light beam 170 or 175 is 300 femtometers (fm). In another example, the nominal output energy of the pulsed light beam 170 or 175 is 15 mJ.

In some implementations, the equation for EError (and/or BWError) includes a relative weighting factor w that can be used to favor one of the margins (Emax or Emin) over the other (Emin or Emax). For example, a higher value of w could favor a larger final Emax and thereby a higher final pressure. In one example, w is 1.5.

The analysis processing system 330 calculates an adjustment size (and direction, if needed) for each operating characteristic based on at least two of these calculated error values [1346]. The analysis processing system 330 performs the following exemplary procedure [1346] on the values EError and BWError to calculate an adjustment size (and direction) to the following two operating characteristics: pressure P of the gas mixture 137 or 142 and an optical feature (such as a bandwidth BW) of a pulsed amplified light beam 170 or 175. The adjustment size for the pressure of the gas mixture 137 or 142 can be referred to as dP, and the adjustment size for the optical feature is governed by dF. In order to adjust the bandwidth BW of either or both of the pulsed amplified light beams 170, 175, one can adjust an optical magnification of either or both of the pulsed amplified light beams 170, 175.

In one example, the optical magnification of the pulsed amplified light beam 170 is adjusted by performing an adjustment to the spectral optical system 476 under control of the spectral feature selection system 150. Specifically, a position of one or more of the prisms 682, 684, 686, 688 is changed (by, for example rotating) to thereby adjust the optical magnification of the pulsed amplified light beam 470 as it impinges upon the grating 680 and thereby adjust a bandwidth of the pulsed amplified light beam 470. The amount of adjustment to make on the prism is given by the term dF.

The adjustment dP to the gas pressure is effected by sending a signal via the gas maintenance processing system 345 to the gas supply system 145 to adjust one or more valves of the valve system 452 to thereby remove (or bleed) gas from the gas discharge chamber 441. Gas can be bled out of the second gas discharge chamber 441 by permitting at least some of the gas mixture 442 to escape from the second gas discharge chamber 441 (for example, and be sent to the gas dump 490).

The values for the adjustments dP and dF are coupled together because changes to both of the operating parameters can impact the gas pressure and the bandwidth of the pulsed light beam. In one example, the values are given in matrix form as follows:

$$\begin{bmatrix} dP \\ dF \end{bmatrix} = \begin{bmatrix} \frac{dP}{dE} & \frac{dP}{dBW} \\ \frac{dF}{dE} & \frac{dF}{dBW} \end{bmatrix} \begin{bmatrix} EError \\ BWError \end{bmatrix},$$

Where dP/dE, dP/dBW, dF/DE, and dF/dBW are calibrated constants or functions of other variables. For example, dP/dE refers to a change in pressure dP that is required to change the energy of the pulsed light beam 170 or 175 by dE. dP/dE can be a constant in some implementations, while in other implementations, dP/dE depends on energy also. As one example, dF/dBW can be given as—(γ1−γ2*F), where γ1 and γ2 are values that are estimated to compensate for nonlinearity in the relationship between the bandwidth BW and the optical feature adjustment size dF and F is a step size for adjusting the optical feature. As an example, γ1=0.03 and γ2=0.001. The above calculation provides for values of adjustment to gas pressure (dP) and adjustment to the optical feature (dF).

As evident from this exemplary equation for dP and dF, the decision to perform adjustment is embedded in the values of EError and BWError. Thus, if EError is 0, then pressure adjustment dP is not required and dP will be 0 in this case, or if BWError is 0, then the optical feature adjustment dF is not required since dF will be 0 in this case.

The control system 165 can therefore determine whether the operating characteristics of gas pressure and optical feature need to be adjusted based on these values of the adjustment dP and dF [1180]. For example, the control system 165 could make the adjustment to the gas pressure by dP (perform a bleed of gas from the gas discharge chamber 141) if, for example, the gas pressure in the gas discharge chamber 141 is greater than a minimum value such as 230 kilopascal (kPA), if the value of Emax is greater than 12, and if the value of Emin is greater than 8. The control system 165 can make an adjustment to the optical feature dF if the actuation system within the spectral optical system 476 is not at its limit or near its acceptable range and if the step size dF is greater than some lower value to prevent jitter within the actuation system.

The sizes of the adjustment steps dP and dF are adaptively altered after each iteration through the procedure [1105]; in this way, it is possible to handle nonlinear behavior in the dynamics of the operation of the light source 100. Moreover, by performing the adjustments to operating characteristics based on the margins (or extreme values) of the operating parameters, it is possible to improve the reliability of the light source 100 because there are fewer issues that arise due to low output energy of the pulsed light beam 175 or saturation of the actuation system for controlling the bandwidth of the pulsed light beam 175.

Figure 15:
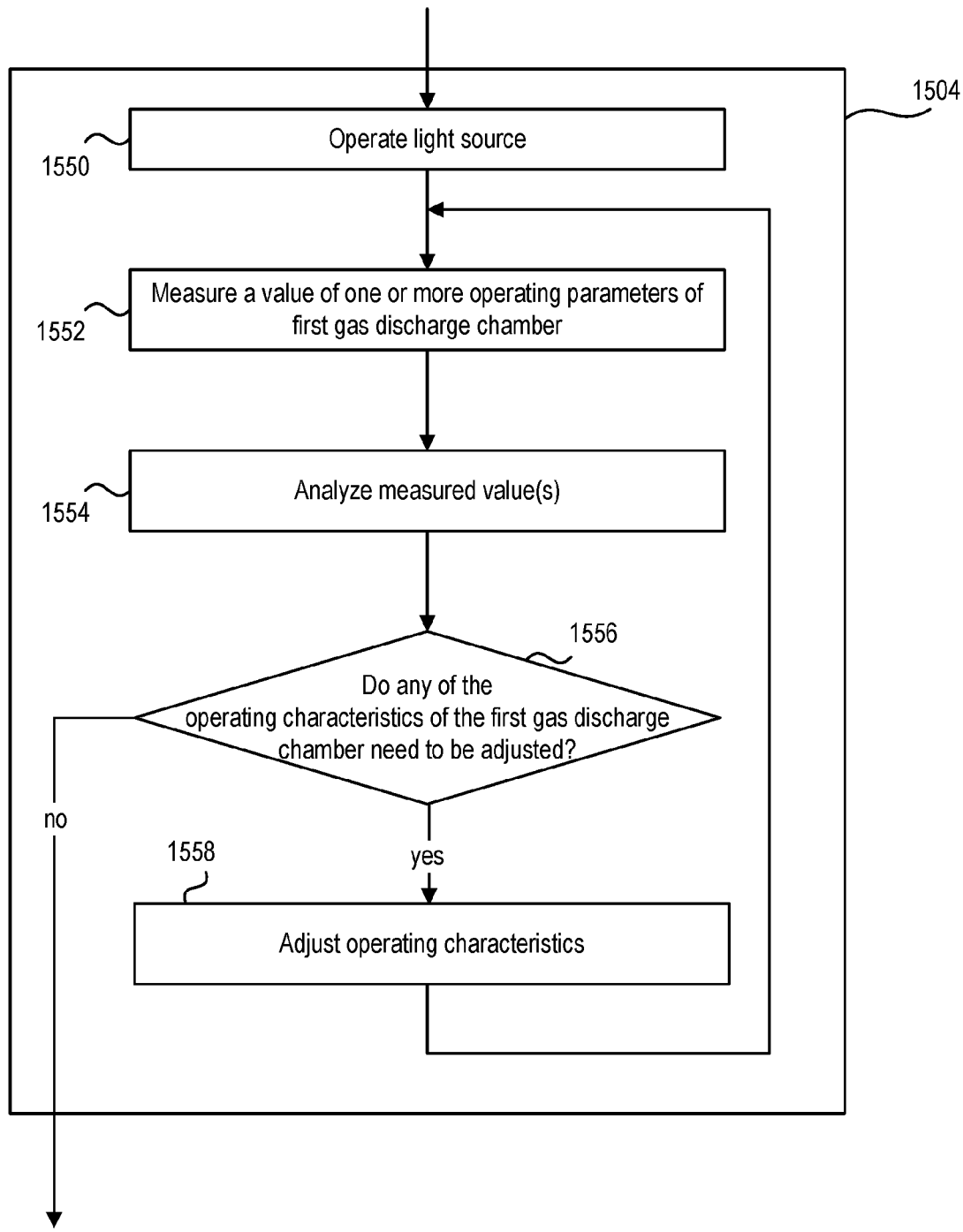
FIG. 15 is a flow chart of an exemplary gas adjustment procedure that can be performed by the gas discharge light source of FIG. 1 or 4.

Referring to FIG. 15, an exemplary gas adjustment procedure [1504] is performed during the procedure [804B] on the first gas discharge chamber 136 prior to performing the gas adjustment procedure [1005] on the second gas discharge chamber 141. The gas adjustment procedure [1504] is performed on the first gas discharge chamber 136 and is completed before the gas adjustment procedure [1005] is performed on the second gas discharge chamber 141. The light source 100 is operated [1550]. For example, energy is supplied to the first gas discharge chamber 136 using the first pulsed energy source 138 until the pulsed amplified light beam 170 is produced. Specifically, the control system 165 sends a signal to the energy control system 155, which provides the pulsed energy to the energy source 138. Next, a value of at least one operating parameter of the first gas discharge chamber 136 is measured [1552]. For example, the control system 165 receives a measurement of the operating parameter from the monitoring system 160. The control system 165 (for example, the analysis processing system 330) analyzes the measured value [1554] and determines whether any of the operating characteristics of the first gas discharge chamber 136 need to be adjusted [1556]. If any of the operating characteristics of the first gas discharge chamber 136 need to be adjusted [1556], then the control system 165 sends one or more signals to the appropriate control systems (such as the gas supply system 145, the spectral feature selection system 150, or the energy control system 155) to adjust those operating characteristics [1558].

A specific example of the procedure [1504] is provided next. An example operating parameter of the first gas discharge chamber 136 that can be probed at [1552] is an energy (Emo) of the pulsed amplified light beam 170 output from the first gas discharge chamber 136. For example, the monitoring system 160 can measure a value of the energy Emo of the pulsed amplified light beam 170, the analysis processing system 330 compares this measured energy Emo to a threshold value, for example, 2.5 mJ, while an energy supplied to the energy source 138 and a differential timing T are held constant. If the analysis processing system 330 determines that the measured energy Emo is greater than this threshold value, then it determines at [1556] that the gas pressure of the gas mixture 137 should be reduced by, for example, bleeding the gas out of the first gas discharge chamber 136 [1558]. Gas can be bled out of the first gas discharge chamber 136 [1558] by permitting at least some of the gas mixture 137 to escape from the first gas discharge chamber 136 (for example, and be sent to the gas dump 490). The energy supplied to the energy source 138 during this measurement [1552] can be selected to be a maximum expected voltage (for example, 1100 volts (V)) and the differential timing T during this measurement [1552] can be detuned (at a non-optimum value) so that little to no energy in the amplified light beam 170 is sent to the second stage 140 to prevent optics damage at higher voltages.

The adjustment procedure 804 can be performed automatically, that is, without the assistance from a person such as a field service engineer.

Other steps can be performed before or after the adjustment procedures [905], [1004], or [1005] or at any time within the adjustment procedures [905], [1004], [1005]. For example, the gas adjustment procedure 804 can include calibration sub-procedures as well as post-processing scans of the light source 100 to determine whether the light source 100 is operating at expected levels.

Other implementations are within the scope of the following claims.

What is claimed is:

1. A method of adjusting one or more operating characteristics of a light source comprising a first stage with a first gas discharge chamber filled with a first gas mixture and including a first pulsed energy source and a second stage with a second gas discharge chamber filled with a second gas mixture and including a second pulsed energy source, the method comprising:

estimating a plurality of extreme values of operating parameters of the light source while operating the light source under a set of extreme test conditions, the estimating comprising, for each extreme test condition:
supplying a group of pulses of energy to the first gas discharge chamber while operating the first gas discharge chamber under the extreme test condition to produce a first pulsed amplified light beam from the first stage that is directed to the second stage;
supplying a group of pulses of energy to the second gas discharge chamber while operating the second gas discharge chamber under the extreme test condition and while the first pulsed amplified light beam is input to the second gas discharge chamber to produce a second pulsed amplified light beam; and
measuring an extreme value of an operating parameter for the extreme test condition;
determining whether to adjust at least one operating characteristic of the light source out of a plurality of operating characteristics based on the estimated plurality of extreme values of operating parameters; and
if it is determined that an operating characteristic should be adjusted, then adjusting that operating characteristic.

2. The method of claim 1, further comprising determining a plurality of error values, each error value being determined from one or more measured extreme values of the operating parameters.

3. The method of claim 1, wherein:
supplying the group of pulses of energy to the first gas discharge chamber comprises supplying a burst of pulses of energy to the first gas discharge chamber; and
supplying the group of pulses of energy to the second gas discharge chamber comprises supplying a burst of pulses of energy to the second gas discharge chamber.

4. The method of claim 1, wherein:
operating the light source under the set of extreme test conditions comprises operating the light source under an extreme test condition in which energy supplied to the first gas discharge chamber is increased while operating at a non-optimum relative timing between pulses of the first amplified light beam and the second amplified light beam; and
measuring the extreme value of the operating parameter for the extreme test condition comprises measuring a maximum energy of the second pulsed amplified light beam.

5. The method of claim 1, wherein:
operating the light source under the set of extreme test conditions comprises operating the light source under an extreme test condition in which energy supplied to the first gas discharge chamber is decreased while operating at an optimum relative timing between pulses of the first amplified light beam and the second amplified light beam; and
measuring the extreme value of the operating parameter for the extreme test condition comprises measuring a minimum energy of the second pulsed amplified light beam.

6. The method of claim 1, wherein:
operating the light source under the set of extreme test conditions comprises operating the light source under an extreme test condition in which a relative timing between pulses of the first amplified light beam and the second amplified light beam is decreased while supplying a minimum energy to the first gas discharge chamber; and
measuring the extreme value of the operating parameter for the extreme test condition comprises measuring a maximum spectral property of the second pulsed amplified light beam.

7. The method of claim 1, wherein:
operating the light source under the set of extreme test conditions comprises operating the light source under an extreme test condition in which a relative timing between pulses of the first amplified light beam and the second amplified light beam is increased while supplying a maximum energy to the first gas discharge chamber; and
measuring the extreme value of the operating parameter for the extreme test condition comprises measuring a minimum spectral property of the second pulsed amplified light beam.

8. The method of claim 1, wherein measuring the extreme value of an operating parameter for the extreme test condition comprises:
measuring a maximum energy of the second pulsed amplified light beam while operating the light source under a first extreme test condition; and
measuring a minimum energy of the second pulsed amplified light beam while operating the light source under a second extreme test condition.

9. The method of claim 1, wherein measuring the extreme value of an operating parameter for the extreme test condition comprises:
measuring a maximum spectral property of the second pulsed amplified light beam while operating the light source under a third extreme test condition; and
measuring a minimum spectral property of the second pulsed amplified light beam while operating the light source under a fourth extreme test condition.

10. The method of claim 1, wherein measuring the extreme value of the operating parameter comprises measuring one or more of:
an extreme value of an energy of the second pulsed amplified light beam, and
an extreme value of a spectral property of the second pulsed amplified light beam.

11. The method of claim 1, wherein:
determining whether to adjust an operating characteristic of the light source is also based on one or more of a plurality of calibrated constants and a plurality of nonlinear functions.

12. The method of claim 1, wherein determining whether to adjust at least one operating characteristic of the light source comprises:
determining whether to adjust a pressure of a gas mixture of at least one of the gas discharge chambers; and
determining whether to adjust an optical feature of a pulsed amplified light beam.

13. The method of claim 12, wherein determining whether to adjust the optical feature of the pulsed amplified light beam comprises determining whether to adjust an optical magnification of the first pulsed amplified light beam.

14. The method of claim 12, wherein adjusting the pressure of the gas mixture of the at least one gas discharge chamber comprises permitting at least some of the gas mixture to escape from the gas discharge chamber.

15. The method of claim 12, wherein adjusting the optical feature of the pulsed amplified light beam comprises adjusting an optical magnification of the first pulsed amplified light beam to thereby adjust a bandwidth of the second pulsed amplified light beam.

16. The method of claim 12, wherein:
determining whether to adjust the pressure of the gas mixture of the at least one gas discharge chamber comprises determining whether a measured pressure of the gas mixture is greater than a lower acceptable value and an energy of the second pulsed amplified light beam is in an acceptable range; and
determining that the pressure of the gas mixture of the at least one gas discharge chamber should be adjusted only if the measured pressure of the gas mixture is greater than the lower acceptable value and the energy of the second pulsed amplified light beam is in the acceptable range.

17. The method of claim 12, wherein:
  determining whether to adjust the optical feature of the pulsed amplified light beam comprises determining whether a condition of a spectral property actuation is met; and
  determining that the optical feature of the pulsed amplified light beam should be adjusted only if the condition of the spectral property actuator is met.

18. The method of claim 12, wherein determining whether to adjust the pressure of the gas mixture of the at least one gas discharge chamber comprises determining whether to adjust the pressure of the gas mixture of the second gas discharge chamber.

19. The method of claim 1, wherein determining whether to adjust at least one operating characteristic of the light source based on the estimated plurality of extreme values of operating parameters comprises:
  determining whether to adjust a first operating characteristic based on at least two estimated extreme values of distinct operating parameters; and
  determining whether to adjust a second operating characteristic based on at least two estimated extreme values of distinct operating parameters.

20. The method of claim 1, wherein:
  estimating the plurality of extreme values of operating parameters comprises at least:
    averaging a first measured extreme value and a second measured extreme value of a first operating parameter to obtain an averaged value of the first operating parameter and adjusting the averaged value of the first operating parameter by a first predetermined range to obtain a first error value; and
    averaging a first measured extreme value and a second measured extreme value of a second operating parameter to obtain an averaged value of the second operating parameter and adjusting the averaged value of the second operating parameter by a second predetermined range to obtain a second error value.

21. The method of claim 20, wherein determining whether to adjust at least one operating characteristic of the light source comprises:
  determining whether to adjust a first operating characteristic based on at least the first and second error values; and
  determining whether to adjust a second operating characteristic based on at least the first and second error values.

22. The method of claim 1, wherein:
  determining whether to adjust at least one operating characteristic of the light source comprises determining whether to adjust at least one operating characteristic associated with the second stage; and
  adjusting the operating characteristic if is determined that the operating characteristic should be adjusted comprises adjusting the operating characteristic associated with the second stage.

23. The method of claim 22, further comprising, prior to determining whether to adjust the at least one operating characteristic associated with the second stage and adjusting the operating characteristic of the second stage if it is determined that it should be adjusted:
  determining whether to adjust one or more operating characteristics associated the first stage; and
  if it is determined that an operating characteristic associated with the first stage should be adjusted, then adjusting the operating characteristic associated with the first stage.

24. The method of claim 1, wherein determining whether to adjust at least one operating characteristic of the light source comprises simultaneously determining whether to adjust a plurality of operating characteristics of the light source.

* * * * *